(12) United States Patent
Kitabayashi et al.

(10) Patent No.: US 6,760,096 B2
(45) Date of Patent: Jul. 6, 2004

(54) LENS-EVALUATING METHOD AND LENS-EVALUATING APPARATUS

(75) Inventors: Masashi Kitabayashi, Suwa (JP); Koichi Kojima, Suwa (JP); Shunji Umemura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/232,399

(22) Filed: Sep. 3, 2002

(65) Prior Publication Data

US 2003/0048436 A1 Mar. 13, 2003

(30) Foreign Application Priority Data

Sep. 3, 2001 (JP) ........................................ 2001-266444

(51) Int. Cl.[7] .............................................. G01B 9/00
(52) U.S. Cl. ...................................... 356/124; 356/125
(58) Field of Search ................................ 356/124–127; 250/461.1; 382/100, 141; 358/55

(56) References Cited

U.S. PATENT DOCUMENTS

| | | | | |
|---|---|---|---|---|
| 3,912,396 A | * | 10/1975 | Hartmann | 356/124.5 |
| 3,930,732 A | * | 1/1976 | Holly | 356/124.5 |
| 4,110,046 A | * | 8/1978 | Baker et al. | 356/124 |
| 4,345,271 A | * | 8/1982 | Sekiguchi | 348/175 |
| 4,682,214 A | * | 7/1987 | Sato et al. | 348/175 |
| 5,303,023 A | * | 4/1994 | Portney et al. | 356/124.5 |
| 5,600,432 A | * | 2/1997 | Lengye et al. | 356/124.5 |
| 5,699,440 A | * | 12/1997 | Carmeli | 382/100 |
| 5,719,668 A | * | 2/1998 | Oana et al. | 356/124 |

FOREIGN PATENT DOCUMENTS

| | | |
|---|---|---|
| JP | A 5-110926 | 4/1993 |
| JP | A 9-105705 | 4/1997 |

* cited by examiner

*Primary Examiner*—Frank G. Font
*Assistant Examiner*—Sang H. Nguyen
(74) *Attorney, Agent, or Firm*—Oliff & Berridge PLC

(57) ABSTRACT

A method for evaluating the quality of a lens comprising illuminating imaging light on a screen through the lens to form a projected image, where the imaging light having a test-pattern image is generated using a test sheet on which a test pattern for measuring a resolution of the lens is formed to evaluate the resolution of the lens; detecting a brightness of the test-pattern image displayed on the screen by an image-capturing device using an imaging sensor; calculating an input level on the basis of the detected brightness of the test-pattern image; and calculating an evaluated value of resolution. The method, further comprises adjusting a position of the test sheet to a position corresponding to a focus of the lens by detecting the test-pattern image while moving the test sheet back and forth in the direction along an optical axis of the lens.

13 Claims, 22 Drawing Sheets

LENS-EVALUATING METHOD AND LENS-EVALUATING APPARATUS

BACKGROUND OF THE INVENTION

1. Field of the Invention

The present invention relates to a method for evaluating the quality of a lens to be used in an optical apparatus such as a projector, which includes the steps of: illuminating imaging light including a test pattern for the measurement of resolution on a screen through the lens; and detecting the brightness of the test pattern image displayed on the screen by an image-capturing device having an image sensor, and calculating the evaluated value of resolution on the basis of the detected brightness level. Also, the present invention relates to a lens-evaluating apparatus using such a lens-evaluating method.

2. Description of the Related Art

Heretofore, there has been used a projector that comprises: a plurality of liquid crystal panels for modulating a plurality of color light beams for each of them on the basis of image information; a cross-dichroic prism for combining color light beams modulated by each of the liquid crystal panels; and a projector lens for forming a projecting image by extending and projecting a beam of light on a screen to form a projected image.

The projector lens used in such a conventional projector may cause variations in its optical characteristics such as image resolution, flare, chromatic aberration, curvature aberration, and the distribution of illuminance of the projected image due to variations in its manufacturing process or the like. Variations in the characteristics of the projector lens influence on the quality of an image displayed on a screen by the projector. Therefore, the characteristics of the lens are evaluated before the shipment of the lens and before the assembly of a projector with the lens.

Concretely, for example, the resolution of the projector lens is evaluated by forming a test pattern for the resolution measurement on a test sheet, illuminating light on the test pattern to generate imaging light that includes a test pattern image, introducing the imaging light into a projector lens provided as a testing sample to be evaluated, and projecting the imaging light from the projector lens on the screen. Then, the test pattern image displayed on the screen is detected by an image capturing apparatus using an image sensor such as a charge coupled device (CCD), followed by subjecting the detected image using a computer or the like to evaluate the resolution of the projector lens.

Similarly, when the projector lens is evaluated for the generation of flare, it can be performed using a flare-testing pattern formed on a test sheet. When the projector lens is evaluated for the generation of chromatic aberration, a color beam filters can be used. Each of the color light beam filters has a function of extracting a color light beam which corresponds to a specific color included in the light emitted from a light source. In other words, the light beam passed through the color beam filters of red, green, and blue illuminates a screen to represent an image of test pattern. Then, the image displayed on the screen is detected by an image-capturing device using an image sensor such as CCD. Subsequently, the detected image is subjected to an arithmetic operation by a computer or the like to evaluate the chromatic aberration of the projector lens.

Furthermore, for evaluating the curvature aberration of the projector lens and the illuminating distribution of a projected image, an image of test pattern displayed on the screen is visually observed to check the qualities.

Conventionally, a basic lens has been applied in the method for evaluating the quality of a lens. In such a method, the deviation between the basic lens and a target lens to be evaluated is measured to evaluate the quality of the target lens. Specifically, the basic lens that shows an average level of each characteristic of the lens is used for the evaluation, where a test sheet is adjusted to be positioned on the back-focal surface of the basic lens. Then, an imaging beam illuminates a screen through the basic lens. Subsequently, an image sensor positioned on each of four corners of the screen scans a test pattern formed on the test sheet by means of a pattern matching. The test pattern is imaged and is then provided image data. From the resulting image data, it is judged whether focus is achieved using a specific indexical value (edge strength) of the test pattern image to check the quality of focusing. As a result, four indexical values can be obtained. Depending on the resulting four indexical values, a six-axis adjusting part is controlled to adjust the spatial arrangement of the test sheet (test pattern) such that these four indexical values become almost equal to each other and become the maximum values. Subsequently, in a state of fixing the test sheet being justified using the basic lens, the target lens to be evaluated is subjected to the characteristic evaluation of the lens.

Therefore, the evaluation of optical characteristics of the lens in quick motion can be performed because of no need to adjust the focus of the target lens on the test sheet.

However, the back-focal surface of the actual lens is curved. Such a curvature of the back focus of the lens is unique to an individual lens. In other words, the positioning of the test sheet is performed using the basic lens, and the evaluation of the quality of each lens is performed on the position of the test sheet being adjusted by the basic lens. For the evaluation of optical characteristics of each lens, there is a problem that the quality of the lens can be evaluated under the conditions in which the test sheet (test pattern) and the back-focal surface of each lens are misaligned with respect to each other.

If the evaluations are carried out to check the curvature aberration of the projector lens and the illuminating distribution of the projected image by visually observing the projected image, the exact characteristic value of the project lens cannot be obtained and a criterion of judgment whether the characteristic value is acceptable or not is obscure.

SUMMARY OF THE INVENTION

A primary object of the present invention is to provide a method for properly evaluating the characteristics of a lens and a lens-evaluating apparatus using such a method.

A method for evaluating the quality of a lens (also referred to as a lens-evaluating method) in accordance with present invention comprising: illuminating imaging light on a screen through the lens to form a projected image, where the imaging light having a test-pattern image is generated using a test sheet on which a test pattern for measuring a resolution of the lens is formed to evaluate the resolution; detecting a brightness of the test-pattern image displayed on the screen by an image-capturing device using an imaging sensor; calculating an input level on the basis of the detected brightness of the test-pattern image; and calculating an evaluated value of resolution, and adjusting a position of the test sheet to a position corresponding to a focus of the lens by detecting the test-pattern image while moving the test sheet back and forth in the direction along an optical axis of the lens.

Here, the imaging element may be selected from a CCD (charge-coupled device) sensor, a MOS (metal oxide semiconductor) sensor, and so on. Also, the image-capturing device may be a device for obtaining image data, such as a video capture board that receives an output from the imaging element and converts it into an image signal to be transmitted to a computer.

According to the present invention, as the method has the step of adjusting the focus of the projector lens, the evaluated value of resolution can be calculated on the basis of imaging light detected under the condition in which the position of the test sheet is adjusted to the focal position of the test lens. Therefore, it becomes possible to correctly calculate the evaluated value of resolution by preventing the image from out of focus or the like due to a bend in the back-focal surface of the lens or the like.

In addition, for focal adjustment of each lens, the deviation obtained by shifting the test sheet in the direction along the optical axis may be recorded to estimate the variation in the process of manufacturing individual lens, allowing the operator to grasp the optical characteristics of the lens with a high degree of accuracy.

In the above description, preferably, the method for evaluating the quality of a lens may comprise: switching the imaging light including the test-pattern image into a plurality of color light beams; and measuring a chromatic aberration of the lens on an optical axis thereof by detecting a plurality of imaging light beams corresponding to the plurality of color light beams being switched.

Here, the chromatic aberration of the lens can be measured by acquiring the focal position by moving the test sheet back and forth in the direction along the optical axis of the lens on the basis of a switched color light beam.

According to the present invention, as the method has the step of switching color light beams and the step of measuring chromatic aberration, the optical characteristics of the lens can be measured with a high degree of accuracy because of the measurement of chromatic aberration in addition to evaluate the resolution of the test lens.

Furthermore, there is no need to form an additional pattern for the measurement of chromatic aberration on the test sheet, so that the test pattern on the test sheet can be simplified.

Preferably, the lens may be constructed as a combination of lenses in which a plurality of converging elements is arranged in the direction along the optical axis of the lens. If a zooming mechanism is provided for allowing the projected image to be scaled up or down by changing a relative position of each of the converging elements, the steps of illuminating the imaging light, detecting the imaging light, calculating the input level, and calculating the evaluated value may be performed at least at a minimum magnitude of the lens and a maximum magnitude of the lens.

As described above, the evaluation of resolution can be performed at the minimum and maximum magnifications of the lens. Therefore, the resolution of a scalable combination of lenses can be evaluated even if it is scaled up or scaled down with a high degree of accuracy.

Preferably, furthermore, if the imaging element is constructed so as to be movable along the surface of the screen, the method may further comprise the steps of: moving the imaging element along an outer peripheral end of the project image on the screen; acquiring an end image by the image-capturing device using the imaging element at a predetermined position during the movement of the imaging element by the step of moving the imaging element; and calculating the amount of curvature aberration of the projected image on the basis of the end image of the projected image acquired by the step of acquiring the end image.

According to the present invention, the imaging element is capable of moving along the surface of the screen. As the methods includes the steps of moving the image element, acquiring the end image, and calculating the amount of curvature aberration, the imaging element is allowed to move along an outer peripheral end of the project image on the screen. Thus, an end image can be acquired by the image-capturing device using the imaging element at a predetermined position during the movement of the imaging element by the step of moving the imaging element. Therefore, it eliminates ambiguity over the accuracy of evaluation, which has been performed by visual observation, resulting in the correct evaluation of curvature aberration.

Preferably, furthermore, if the test sheet includes a frame portion formed in the vicinity of a periphery of an area on which the projecting image is formed, the step of acquiring the end image may acquire an image of the frame portion formed on the screen.

Furthermore, as the image of the frame-shaped shading portion is acquired by the step for the acquisition of the end image, the brightness levels of the image of the shading portion can be obtained within the range between the bright area on the outside of the frame-shaped portion and the bright area on the inside of the shading portion, the predetermined brightness level can be used as a threshold to grasp positions corresponding to such a threshold, by which the frame-shaped portion is sandwiched. Therefore, the middle point is calculated from these positions, so that the coordinates of the middle of the image of the shading portion can be easily grasped. Thus, such coordinates can be used to acquire the amount of aberration with a high precision in contrast to the designed value and to evaluate the curvature aberration of the lens can be evaluated with a higher degree of accuracy.

Preferably, in the above method for evaluating the quality of a lens, if the steps of illuminating the imaging light, detecting the imaging light, calculating the input level, and calculating the evaluated value are performed on a plurality of positions within the projected image, the method may further comprise the steps of: acquiring an illuminance at a predetermined position, on which the steps of illuminating the imaging light, detecting the imaging light, calculating the input level, and calculating the evaluated value are performed, in the projected image; and calculating an in-plane illuminance of the whole projecting image by calculating an illuminance of other position on the basis of the input level and the illuminance of the predetermined position and an input level of other position.

Here, the specified calculation of in-plane illuminance can be performed with the following equation.

$$Le = Lo \times lie / lio$$

wherein lie denotes an input level of the other position, lio denotes an input level of the predetermined position, and Lo denotes an illuminance of the predetermined position.

According to the present invention, the illuminance at other position can be calculated on the basis of input levels of a plurality of positions only by acquiring the illuminance at a predetermined position through the illuminometer. Therefore, the in-plane illuminance of the projected lens can be acquired by the measurement of illuminance only at one predetermined position in the projected image, grasping the optical characteristics of the lens with a higher accuracy.

An apparatus for evaluating the quality of a lens (also referred to as a lens-evaluating apparatus), comprises: a test sheet on which a test pattern for evaluating a resolution of a lens is formed; a light source for introducing imaging light into the lens by illuminating light on the test sheet, where the imaging light includes a test-pattern image generated by the test pattern; a screen on which the imaging light is projected from the lens; an image sensor for imaging the test-pattern displayed on the screen; an image-capturing part for generating an image signal by capturing an image taken by the image sensor; and a signal-processor including a calculator for obtaining an evaluated value of resolution, in which an input level and the evaluated value of resolution are computed on the basis of the image signal outputted from the image-capturing part, wherein the signal-processor has a means for adjusting a position of the test sheet to a position corresponding to a focus of the lens by detecting the test-pattern image while moving the test sheet back and forth in the direction along an optical axis of the lens.

According to the present invention, as the apparatus has the means for adjusting the focus of the projector lens, the evaluated value of resolution can be calculated on the basis of imaging light detected under the condition in which the position of the test sheet is adjusted to the focal position of the test lens. Therefore, it becomes possible to obtain the same actions and the same effects as those obtained by the method for evaluating the quality of the lens.

In the above description, preferably, the apparatus for evaluating the quality of a lens may further comprise: a switching part for switching the imaging light including the test-pattern image into a plurality of color light beams; and a measuring part for measuring a chromatic aberration of the lens on an optical axis thereof by detecting a plurality of imaging light beams corresponding to the plurality of color light beams being switched.

According to the present invention, as the apparatus has the switching part for switching color light beams and the measuring part for measuring chromatic aberration, it is possible to obtain the same actions and the same effects as those obtained by the method for evaluating the quality of the lens because of the measurement of chromatic aberration in addition to evaluate the resolution of the test lens.

Preferably, the apparatus for evaluating the quality of a lens in accordance with the present invention may further comprise: a mechanism for moving the imaging element along the surface of the screen, wherein the signal processor includes: an imaging element controller for controlling a movement of the imaging element along an outer peripheral end of the projected image on the screen; an end image detector for acquiring an end image by the image-capturing device using the imaging element at a predetermined position during the movement of the imaging element by the imaging element controller, and a calculator for calculating the amount of curvature aberration of the projected image on the basis of the end image of the projected image acquired by the end image detector.

According to the present invention, there is provided a mechanism for moving the imaging element along the surface of the screen, and the signal processor includes the imaging element controller, the end-image detector, and the calculator for calculating the amount of curvature aberration. Therefore, the amount of curvature aberration of the lens can be calculated by the calculator for calculating the amount of curvature aberration, so that it becomes possible to obtain the same actions and the same effects as those obtained by the method for evaluating the quality of the lens.

Preferably, in the apparatus for evaluating the quality of a lens in accordance with present invention, the test sheet may include a frame portion formed in the vicinity of a periphery of an area on which the projecting image on the screen is formed.

According to the present invention, the test sheet has frame portion formed in the vicinity of a periphery of an area on which the projecting image on the screen is formed, so that the imaging element can be moved along the periphery of the frame portion by the image element controller to acquire the end image of the frame portion at the predetermined position by the end image detector, allowing the calculation of the amount of curvature aberration based on the resulting end image by the calculator of the amount of curvature aberration. Therefore, the signal processor may easily obtain the end image of the frame portion to calculate the amount of curvature aberration, so that the amount of curvature aberration of the lens can be quickly evaluated with a high accuracy.

Preferably, in the apparatus for evaluating the quality of a lens in accordance with present invention, the test sheet may include a flame portion formed in the vicinity of a periphery of an area on which the projecting image on the screen is formed.

According to the present invention, the test sheet has a flame portion formed in the vicinity of a periphery of an area on which the projecting image on the screen is formed, so that the imaging element can be moved along the periphery of the flame portion by the image element controller to acquire the end image of the flame portion at the predetermined position by the end image detector, allowing the calculation of the amount of curvature aberration based on the resulting end image by the calculator of the amount of curvature aberration. Therefore, the signal processor may easily obtain the end image of the frame portion to calculate the amount of curvature aberration, so that the amount of curvature aberration of the lens can be quickly evaluated with a high accuracy.

Preferably, furthermore, the apparatus for evaluating the quality of a lens in accordance with the present invention may further comprise an illuminometer that detects an illuminance of a predetermined position in the projected image.

According to the present invention, as the apparatus includes the illuminometer that detects the illuminance of a predetermined position in the projected image, the difference in illuminance caused by the lens can be evaluated by making a comparison between the detected illuminance levels for each lens under examination.

Preferably, furthermore, in the apparatus for evaluating the quality of a lens in accordance with the present invention, if the acquisition of an input level by the calculator for obtaining the evaluated value of resolution is performed at each of a plurality of positions in the projected image including a predetermined position where the illuminance is detected, the signal processor may include a calculator for calculating an in-plane illuminance of the whole projecting image by calculating an illuminance of other position on the basis of the illuminance of the predetermined position detected by the illuminance detector, the input level of the predetermined position calculated by the calculator for calculating the evaluated value of resolution and the input level of the other position.

According to the present invention, therefore, as the signal processor includes the calculator for obtaining the in-plane illuminance, the in-plane illuminance can be calculated by such a calculator using the same procedure as that of the method of evaluating the quality of the lens. Therefore, it becomes possible to obtain the same actions and the same effects as those obtained by the method for evaluating the quality of the lens.

DETAILED DESCRIPTION OF THE PREFERRED EMBODIMENTS

Hereinafter, we will describe one of preferred embodiments of the present invention with reference to the attached drawings.

[1] The Configuration of Projector Where Projector Lens is Built in.

Figure 1:
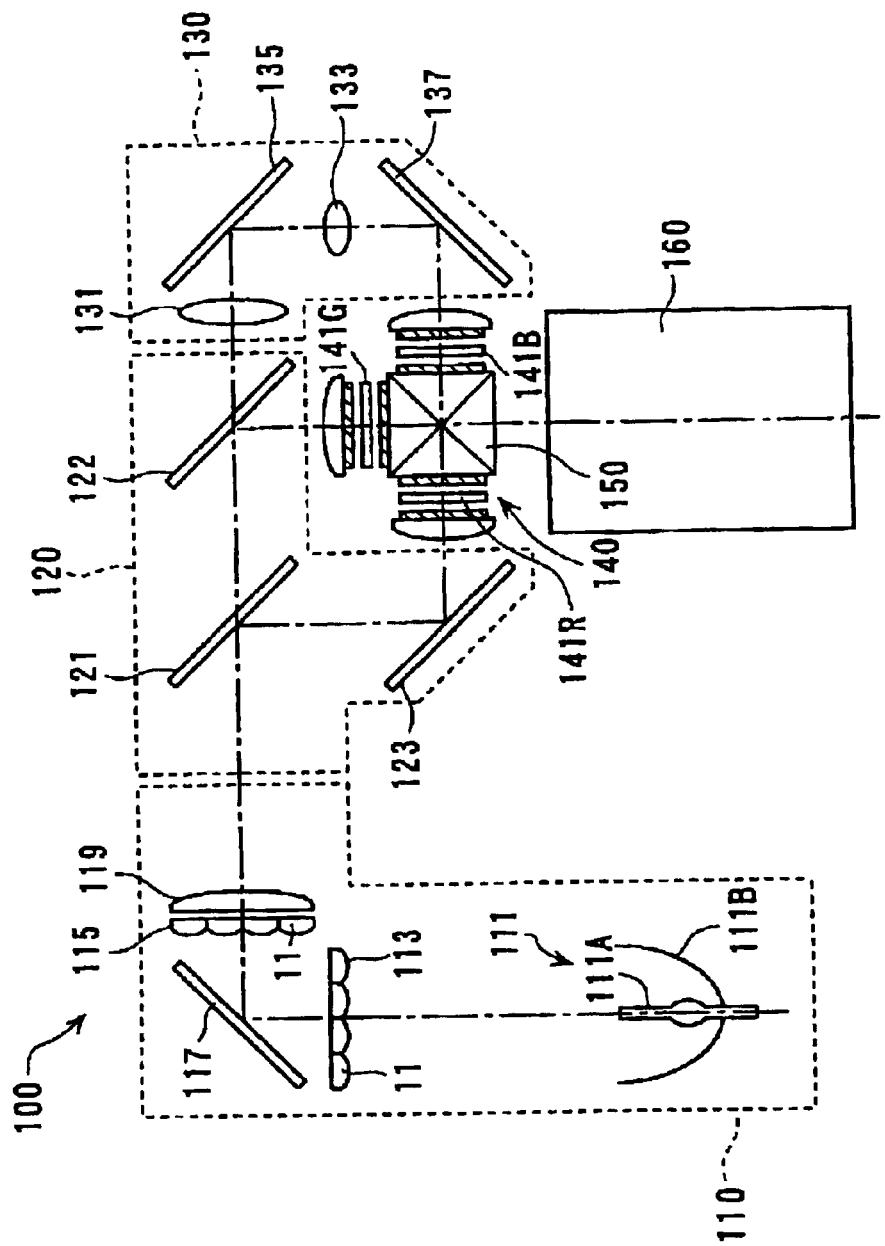
FIG. 1 is a schematic diagram that illustrates the configuration of the projector using the lens to be evaluated by the lens-evaluating apparatus in accordance with one of the embodiments of the present invention.

FIG. 1 illustrates the configuration of a projector 100 where a projector lens is built in. The projector 100 comprises an optical system 110 for integrator illumination, an optical system 120 for color separation, an optical system 130 for relay, an electro-optical device 140, a cross-dichroic prism 150 to be provided as a color-combining optical system, and a projector lens 160 which is provided as a projecting optical system.

The optical system 110 for integrator illumination comprises a lighting device 111 having a lamp 111A as a light source and a light reflector 111B, a first lens array 113, a second lens array 115, a reflecting mirror 117, and a superposed lens 119. Rays of light emitted from the lamp 111A are aligned in the illuminating direction by the reflector 111B and are then divided into a plurality of sub-bundles of light by passing through the first lens array 113. Then, the light is reflected on a returning mirror such that the illuminating direction of the light is turned off at an angle of 90 degrees, followed by focusing to a point in the vicinity of the second lens array 115. Each of the sub-bundles of light generated from the second lens array 115 enters in an incident surface of the superimposed lens 119 at a subsequent stage such that a central axis (chief ray) of the sub-bundle of light is perpendicular to the incident surface of the superimposed lens 119. Furthermore, the plurality of the sub-bundles of light from the superimposed lens 119 are superimposed on three liquid crystal panels 141R, 141G, and 141B that constitute the electro-optical device 140.

The optical system 120 for color separation comprises two dichroic mirrors 121, 122 and a reflecting mirror 123. Such an optical system 120 is capable of separating a plurality of sub-bundles of light emitted from the optical system 110 for integrator illumination into three color beams of red, green, and blue by these mirrors 121, 122, and 123.

The relaying optical system 130 comprises an incident lens 131, a relay lens 133, and reflecting mirrors 135, 137. Such an optical system 130 is capable of introducing the color beam separated in the optical system 120, for example introducing a blue beam into the liquid panel 141B.

The electro-optical device 140 comprises three liquid crystal panes 141R, 141G, and 141B. For instance, each of them may be a polysilicon TFT used as a switching element. Each color beam separated by the optical system 120 is modulated on the basis of image information by these three liquid panels 141R, 141G, and 141B to form an optical image.

The cross-dichroic prism 150 to be provided as the color-combining optical system forms a color image by combining the modulated images of the respective color beams generated from the above three liquid crystal panels 141R, 141G, and 141B. The color image combined through the cross-dichroic prism 150 is emitted from the projector lens 160 and is then extended and projected on a screen.

[2] Evaluating Apparatus for Projector Lens

Figure 2:
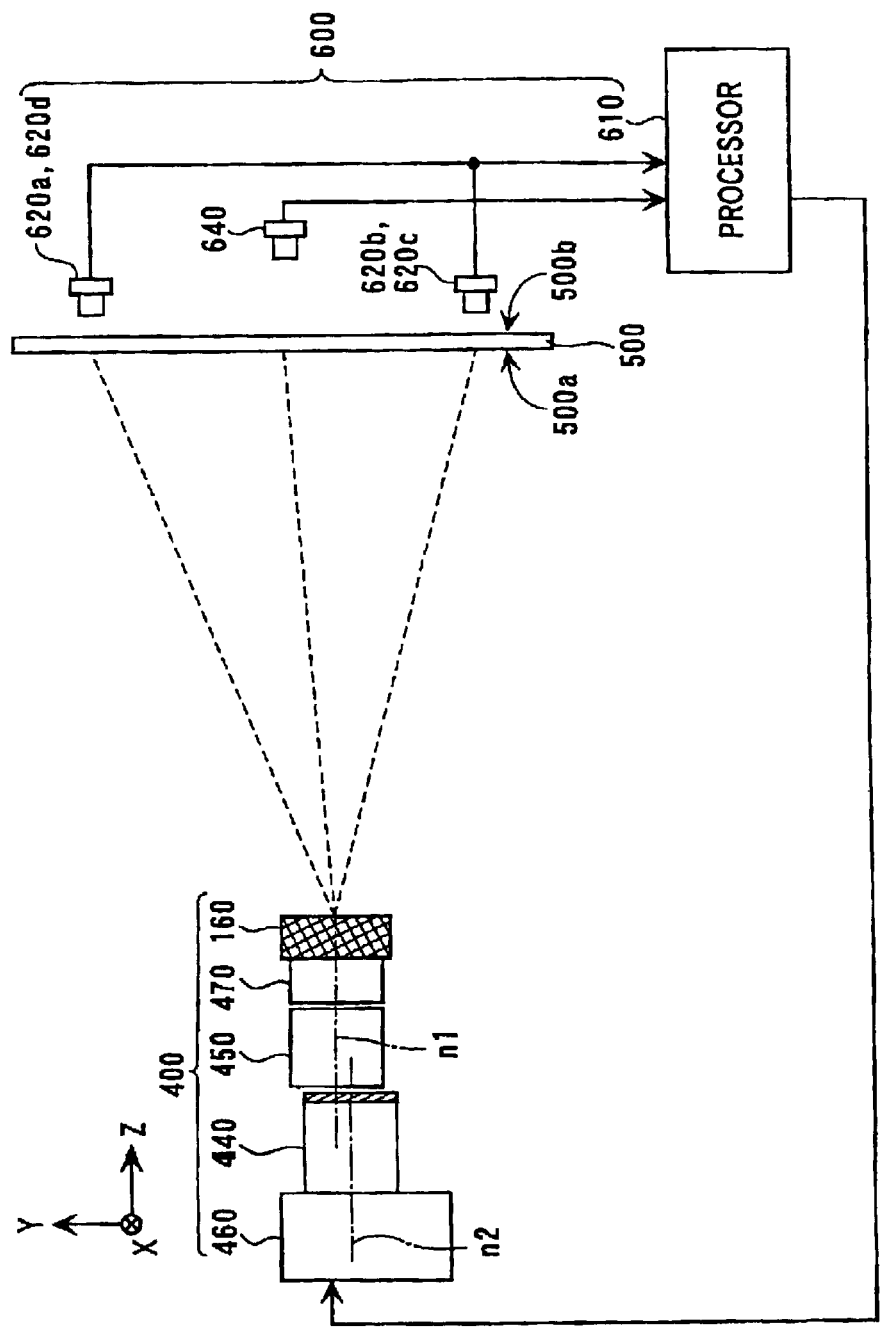
FIG. 2 is a schematic diagram that illustrates the configuration of the lens-evaluating apparatus in accordance with the above embodiment.

FIG. 2 is an explanatory drawing of an apparatus for evaluating the quality of a project lens in accordance with one of preferred embodiment of the present invention.

The apparatus shown in FIG. 2 is provided for evaluating the quality of a projector lens 160 using the projector 100 shown in FIG. 1.

The projector-lens evaluating apparatus of the present embodiment comprises a projecting part (also referred to as a projector) 400 on which the projector lens 160 is mounted as a target of the evaluation, a screen 500, and a measuring part 600. In this apparatus, the projector lens 160 is detachable, so that it can be replaced with another one.

The projector 400 is correctly positioned with respect to the screen 500, so that imaging light (light that represents an image) emitted from the projector 400 directly illuminates the screen 500. Here, the screen 500 may be a translucent screen having a projecting surface 500a and a back surface 500b. In this case, an image can be observed from the opposite side 500b of the projecting surface 500a. The measuring part 600 performs the evaluation of the optical characteristics of the projector lens 160 using the image displayed on the screen 500.

In the following description, as shown in FIG. 2, the evaluating apparatus will be represented by an orthogonal coordinate system of X, Y, and Z in which a plane in parallel with the projecting surface 500a of the screen 500 is defined as an X–Y plane. Furthermore, the central axis n1 of the projector lens 160 is perpendicular to the X–Y plane.

Figure 3:
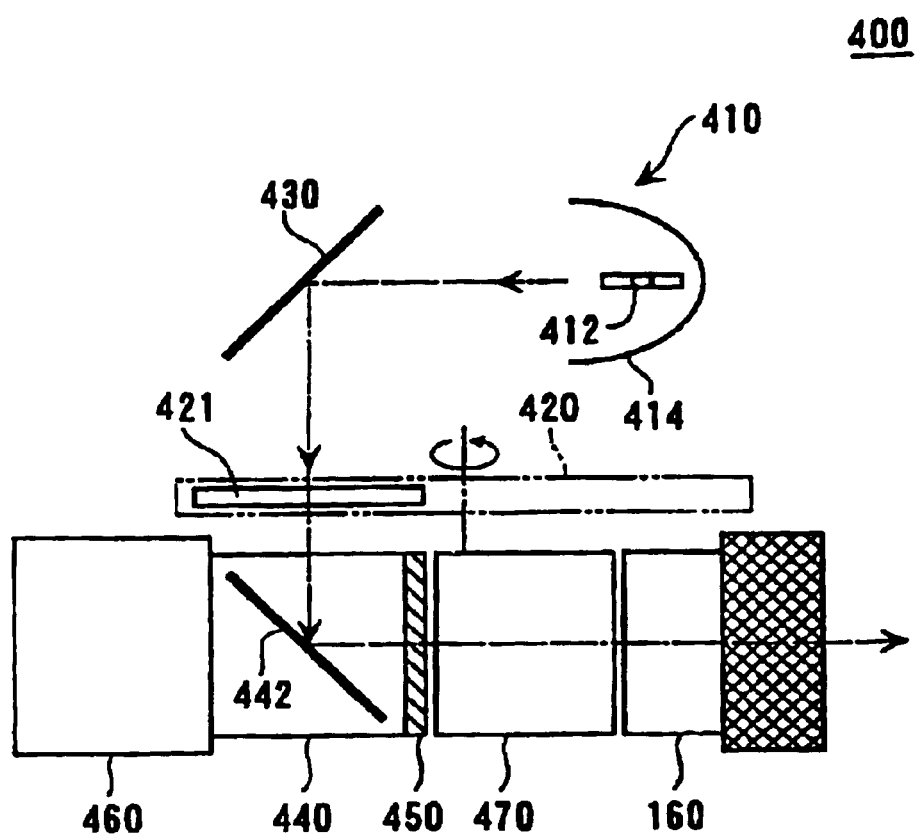
FIG. 3 is a schematic diagram that illustrates the configuration of the projecting part of the above embodiment.

FIG. 3 is an explanatory diagram for illustrating the configuration of the projector 400 viewing from the +Y direction. As shown in FIG. 2 or FIG. 3, the projector 400 further comprises a light source 410, a filter carrier 420, first and second mirrors 430, 442, a test sheet holder 440, a test sheet 450 for the projector lens, a 6-axis adjuster 460, and a dummy prism 470.

Furthermore, the test sheet holder 440 holds the test sheet 450 without touching to the second mirror 442. In FIG. 2, the first mirror 430 and the light source 410 shown in FIG. 3 is located upstream of the 6-axis adjuster 460, the test sheet holder 440, dummy prism 470, and the projector lens 160 in the +X direction (toward the back of the figure), so that it is omitted from the figure for convenience.

Furthermore, as shown in FIG. 3, the projector 400 is constructed such that almost the same light just as one used in the case of the projector lens in the projector 100 of FIG. 1 is incident on the projector lens 160. In other words, the light source 410 corresponds to the light source 111 of FIG. 1, the projector-lens test sheet 450 corresponds to the liquid panels 141R, 141G, and 141B, and the dummy prism 470 corresponds to the cross-dichroic prism 150 of FIG. 1. Therefore, if the evaluating apparatus having such a projector 400 is used, the quality of the project lens may be evaluated under the same circumferences as those of using the projector lens in the projector.

The light source 410 comprises a lamp 412 and a parabolic reflector 414. The parabolic reflector 414 has a concave in the shape of a paraboloid. The lamp 412 is arranged in the vicinity of the focal point in the concave shaped like a paraboloid Therefore, such a configuration of the light source 410 allows that the light ejected from the lamp 412 and reflected from the parabolic reflector 414 is then formed as a beam of light almost in parallel, followed by generating from the light source 410. Here, the lamp 412 may be a metal halide lamp, a high-pressure mercury lamp, or the like. In addition, the parabolic reflector 414 may be, for example, one on which a reflective film made of a dielectric multilayer film, a metallic film or the like formed on the concave of the paraboloid made of glass ceramic or the like.

The first and second mirrors 430, 442 are functioned as a light guide for inducing the color beam emitted from the light source 410 and passed through the color filter 421 into the projector lens 160. As each of the first and second mirrors 430, 442, a mirror on which the dielectric multilayer film is formed, a metallic mirror, or the like, which reflects all of the color beams.

The filter carrier 420 is functioned as a switch for selecting a color of the beam of light emitted from the light source 410, on which a plurality of color filters 421 such as red, blue, and green can be attached. The different color light beams can be intruded into the test lens 160 as the filter carrier 420 turning the color filter 421 in the plane perpendicular to the illumination axis of the light source 410 to switch the color filters 421 in the order of red, blue, green, and son on in the case of obtaining chromatic aberration on the axis.

Figure 4:
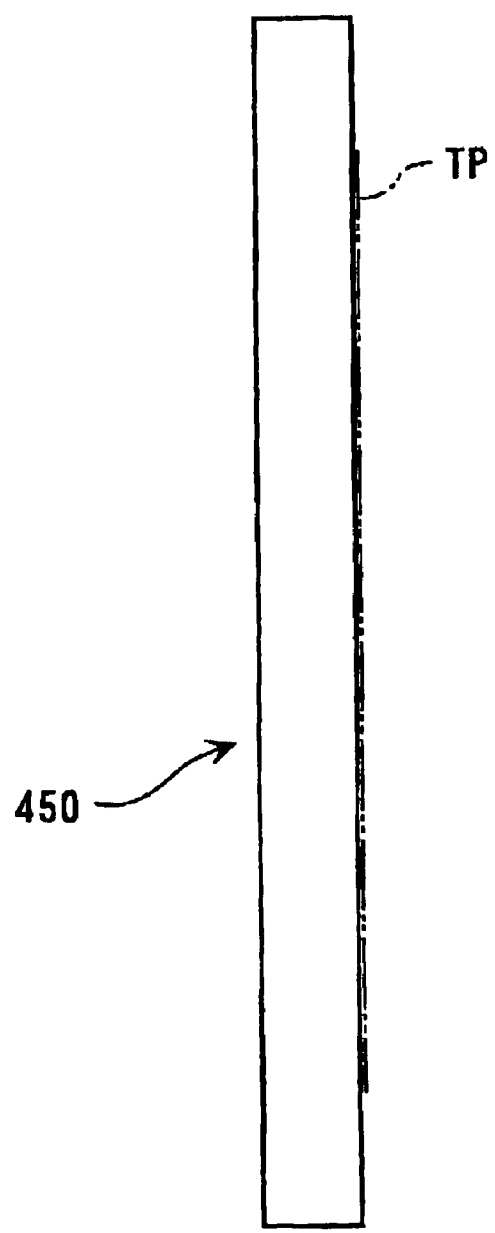
FIG. 4 is a side view of the test sheet of the above embodiment.

As shown in FIG. 4, the test sheet 450 is a transparent substrate made of glass or the like having a predetermined thickness (e.g., 1.1 mm) and having a front surface on which an imaging area (i.e., a test pattern formed area) TP is formed. In addition, the substrate may be of predetermined length and width (e.g., 14.6 m×18 mm) and the inside thereof maybe of predetermined length and width (e.g., 10.8 mm×14.4 mm) formed like a rectangular imaging area (test pattern) TP.

Figure 5:
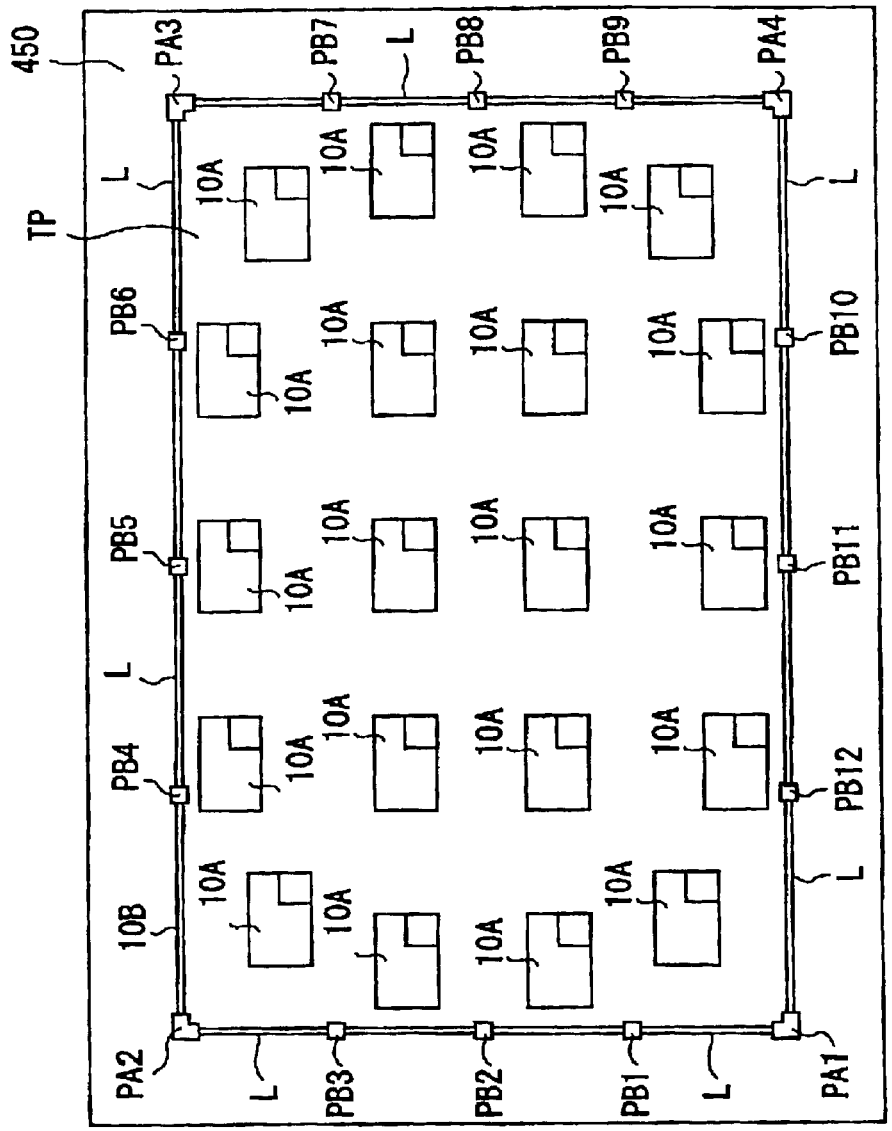
FIG. 5 is a front view of the test sheet of the above embodiment.

As shown in the front view of FIG. 5, the test pattern TP includes a plurality of test patterns 10A for evaluating the optical characteristics of a lens and a light-shielding part 10B in the shape of a rectangle so as to cover all of these test patterns 10A. Such a test pattern TP allows the measurement of optical characteristic values of the lens at a plurality of points on the projecting area on the basis of the light from the projector lens 160.

Figure 6:
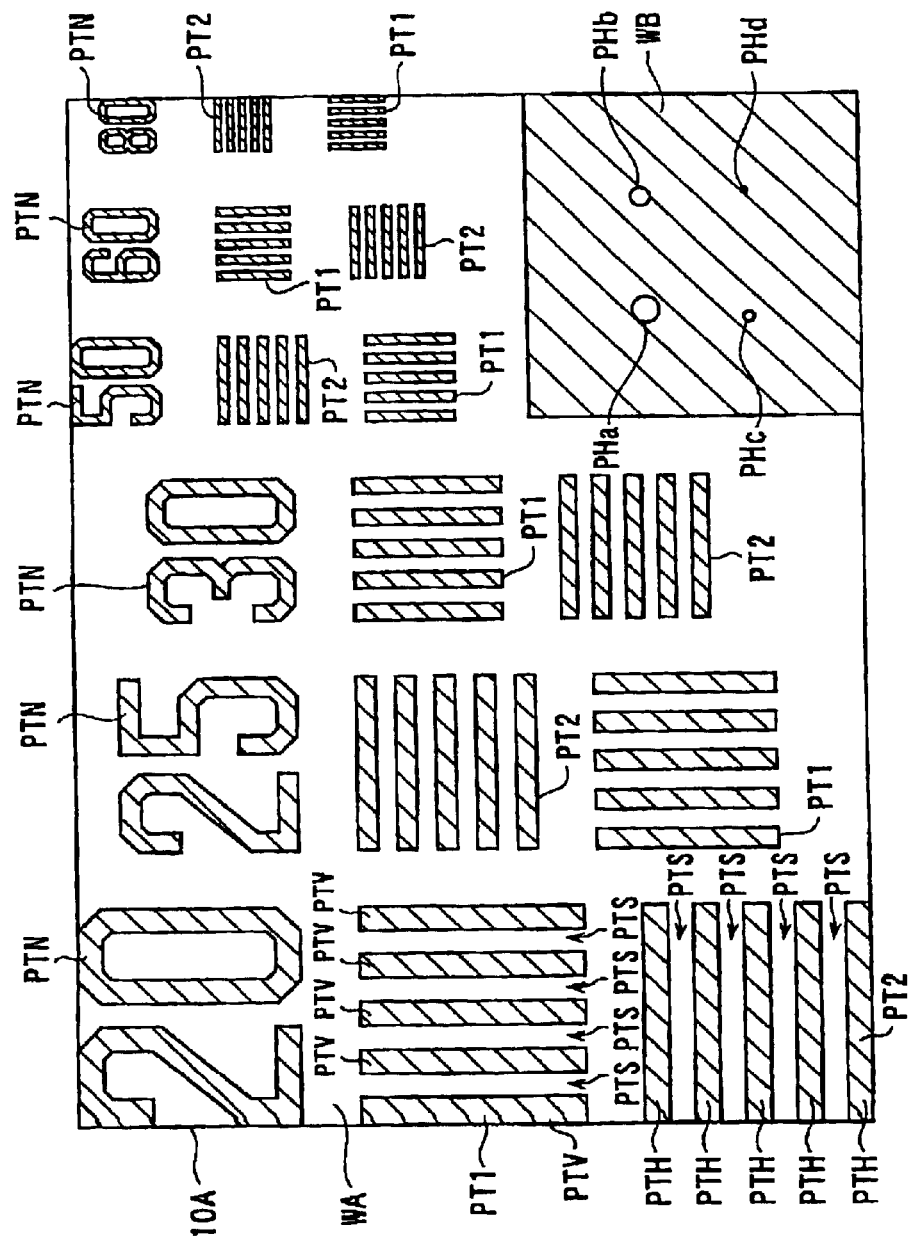
FIG. 6 is a schematic diagram that illustrates a test pattern in the test sheet of the above embodiment.

As shown in FIG. 6, the test pattern 10A for evaluating the resolution of a lens is in the shape of a rectangle with predetermined length and width (e.g., 795 $\mu$m×1074 $\mu$m) In addition, the test pattern 10A is partitioned into two areas WA and WB on the basis of the optical characteristics to be investigated.

The first area WA includes a plurality of patterns which can be divided into two classes PT1 and PT2. The pattern PT1 is constructed of a plurality of shading areas being arranged in the vertical direction with the space between adjacent areas. In addition, there is a translucent area PTS between the adjacent shading areas PTV. On the other hand, the pattern PT2 is constructed of a plurality of shading areas PTH being arranged in the horizontal direction with the space between adjacent areas. Just as with the pattern PT1, a translucent area PTS is formed between adjacent shading areas PTH.

These patterns PT1, PT2 have their own sizes corresponding with the sizes of numerical numbers PTN above these patterns in FIG. 6, respectively. Each of the numerical numbers PTN represents an indicator of resolution when a visual check is conducted. Specifically, the numerical numbers PTN denote spatial frequencies of the patterns PT1, PT2 below them, respectively. For instance, each of two patterns PT1, PT2 arranged below the number "20" indicates one that represents a spatial frequency of 20/mm. Similarly, each of two patterns PT1, PT2 arranged below the number "30" indicates one that represents a spatial frequency of 30/mm if the resolution is evaluated by a visual check using these patterns PT1, PT2, the inspecting engineer observes patterns PT1, PT2 which have emitted from the projector lens 160 and formed on the screen 500. In this case, the spatial frequency that allows the engineer to recognize the boundary between the shading area and the translucent area may be used as an indicator of resolution. By the way, the image processing using image sensors will be described later.

The area WB is in the shape of a rectangle with predetermined lateral and vertical dimensions (e.g., 330 µm×340 µm) and includes internal patterns of different-sized small pores PHa–PHd. The pore pattern PHa is of 26 µm in diameter, the pore pattern PHb is of 19 µm in diameter, the pore pattern PHc is of 10 µm in diameter, and the pore pattern PHd is of 5 µm in diameter. The area WB is used when a projector lens evaluating apparatus carries out an automatic measurement, where the amount of flare can be obtained from the difference between the diameter of each pore and the imaging area of the light.

Referring back to FIG. 5, a plurality of the test patterns 10A is formed in an image-forming area of the test sheet 450. In other words, these test patterns 10A are arranged in the image-forming area with the predetermined space between adjacent patterns, resulting in a plurality of the test patterns 10A enclosed with a rectangular shading portion 10B.

The shading portion 10B comprises four test patterns PA1–PA4 arranged on the respective corners of the imaging area, 12 test patterns PB1–PB12 along the edges of the rectangular imaging area, and paring lines L that connect the respective test patterns PB1–PB12.

Figure 7A:
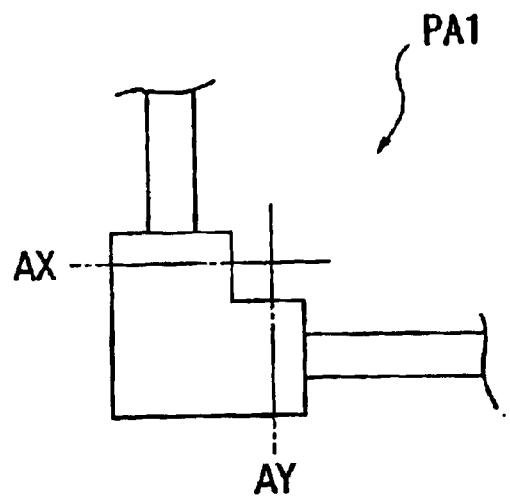
FIGS. 7A and 7B are schematic diagrams that illustrate the configuration of the frame part in the test sheet of the above embodiment.

The test patterns PA1–PA4 arranged on the respective corners are shading portions generally in the shape of the letter L as shown in FIG. 7(a). As will be described later, each of four CCD cameras 602a–620d arranged on the positions corresponding to the respective corners of the projected image takes a projected image of the corresponding test pattern PA1–PA4 to measure a trapezoidal distortion of the projected image.

Each of the test patterns PB1–PB12 arranged along the edges of the imaging area is constructed of a square shading portion. The measurement CCD cameras 640 take images of the test patterns PB1 to PB12 to measure the amount of curvature aberration of the projected image.

The test sheet holder 440 is fixed on the 6-axis adjuster 460 in FIG. 3, so that the arrangement of the test sheet holder 440 can be adjusted by regulating the 6-axis adjuster 460. The 6-axis adjuster 460 is a combination of six movable stages capable of parallel displacements in X, Y, and Z directions and rotations about X, Y, and Z axes. Regulating the 6-axis adjuster 460 allows the adjustment of a spatial arrangement of the test sheet 450 held by the test sheet holder 440. In other words, a spatial arrangement of the test pattern TP can be adjusted by regulating the 6-axis adjuster 460.

The dummy prism 470 is provided for the simulation of the cross-dichroic prism 150 in the projector 100 shown in FIG. 1. In the cross-dichroic prism 150 shown in FIG. 1, a thin film shaped like a letter "X" is provided for the combination of light beams emitted from three liquid crystal panels 141R, 141G, 141B. In the present evaluating apparatus, however, there is no need to apply such a thin film. A cubic glass coated with an anti-reflecting coating is used as a dummy prism 470, just as with the cross-dichroic prism 150.

The projector lens holder 480 adjusts the height of the projector lens 160, as shown in FIG. 2, so that a distance between the central axis n1 of the projector lens 160 and the normal line n2 passing through the center of the test sheet 450 can be adjusted. This is for simulating the condition of "tilted projection" by the projector. The projector lens 160 is designed such that an image without distortion can be displayed by the projection under such a tilting condition. Here, the term "tilted projection" generally refers to the projection in which the central axis n1 of the projector lens 160 and the normal line n2 passing through the center of the test sheet 450 are not coincident with each other.

The above configuration of the projector 400 allows the light emitted from the light source 410 (FIG. 3) to be reflected from the first and second mirrors 430, 442. The reflecting light from the second mirror 442 passes through the test sheet 450 and is then emitted as imaging light that represents an image of the imaging area TB. The imaging light can be projected by the projector lens 160 after passing through the dummy prism 470.

As shown in FIG. 2, the measurement part 600 comprises the processor 610, four adjustment CCD cameras 620a–620d arranged in the vicinity of four corners of the screen 500, a measurement CCD camera 640, and an illuminometer 650 (FIG. 10) arranged in the vicinity of the screen 500.

Figure 8:
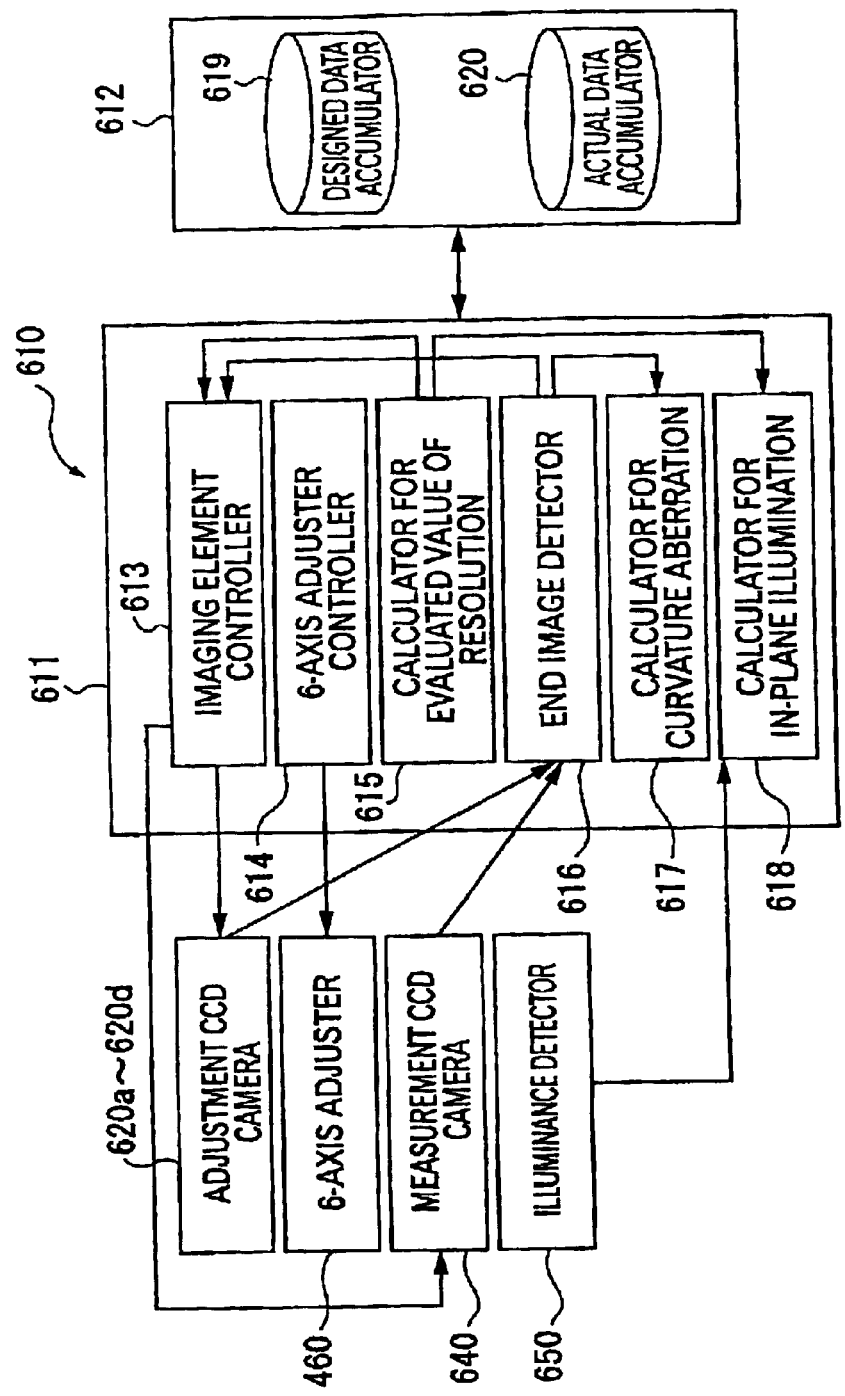
FIG. 8 is a block diagram that illustrates the configuration of the processor of the above embodiment.
Figure 9:
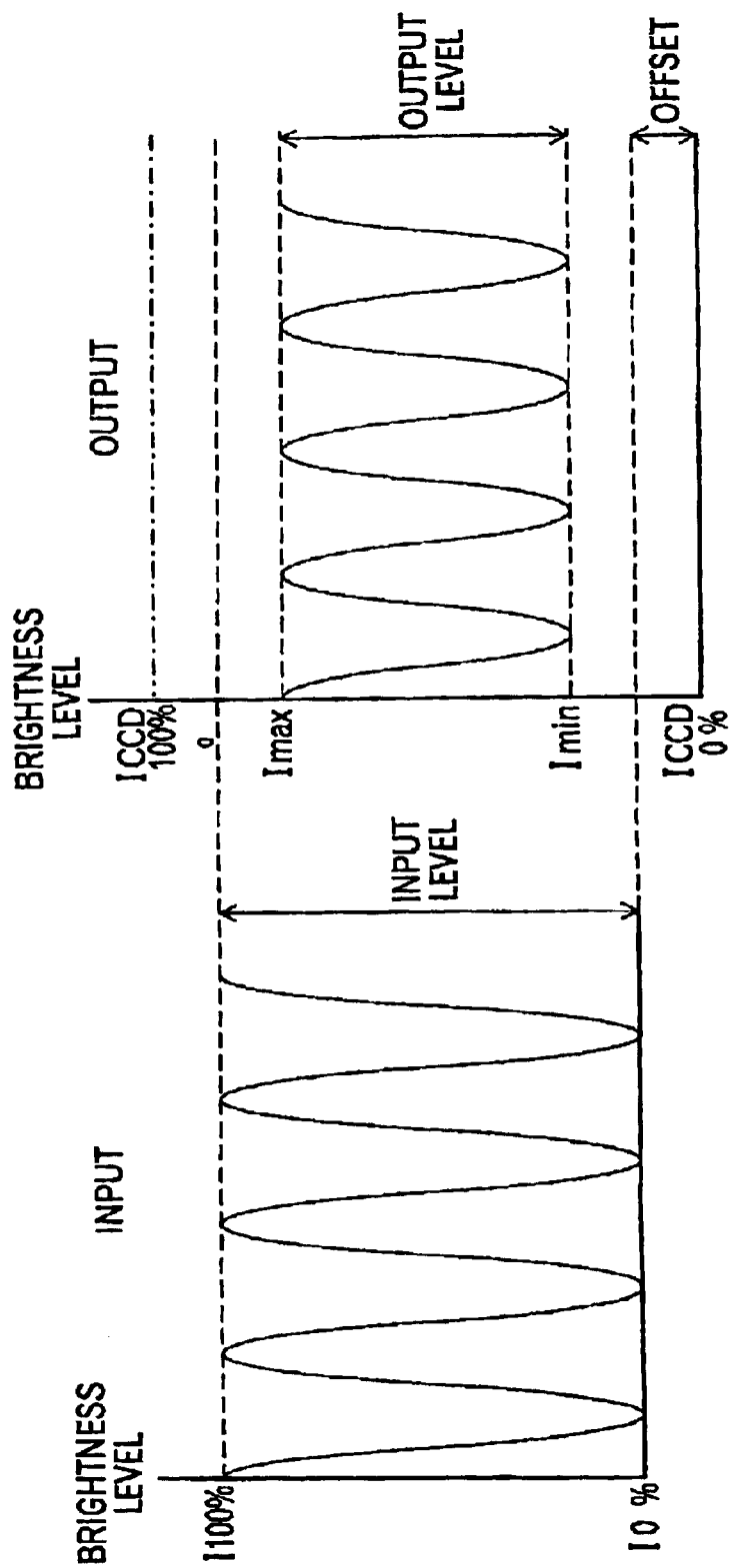
FIG. 9 is a graph that represents the relationship between the input level and the output level in the case of calculating the evaluated value of resolution in accordance with the above embodiment.

The processor 610 captures the images obtained by one measurement CCD camera 640, and four adjustment CCD cameras 620a–620d in the measuring part 600 through an image-capturing device such as a video-capture board. Then, the processor 610 acquires an illumination level from the illuminometer 650. As shown in FIG. 8, the processor 610 is constructed as a computer having a processor unit 611 and a storage unit 612.

The processor 610 comprises an image sensor controller 613, a 6-axis adjuster controller 614, a calculator 615 for obtaining the evaluated value of resolution, an end image detector 616, a calculator 617 for obtaining the amount of curvature aberration, and a calculator 618 for obtaining the in-plane illumination level, which are provided as programs distributed in an operating system (OS) that controls the whole mechanisms of the computer including the processor unit 611, and a designed data accumulator and an actual measurement data accumulator 620 which are constructed by allocating the predetermined area in the storage unit 612.

The end image detector 616 is constructed to detect an end image of the projected image taken by the adjustment CCD cameras 620a–620d and the measurement CCD camera 640 as an image signal adapted to the computer through the image-capturing device, and transmits the detected image signal to the calculator 617 for obtaining the amount of curvature aberration while generating a signal indicating that the judgment of the boundary of the projected image has completed to the image sensor controller 613.

The image sensor controller 613 controls the movements of the adjustment CCD cameras 620a–620d to their respective initial positions corresponding to the projected image and also controls the movement of the measurement CCD camera 640 along the outer peripheral end of the projected image, so that the measurement CCD camera 640 can be sequentially shifted along the outer peripheral end of the projected image using the fact that the detection of an image signal by the end image detector 616 has completed as a trigger. Furthermore, a movement mechanism of the CCD camera 640 includes a step motor, while the image sensor controller 613 applies a control signal on the step motor. The control signal is of the number of pulse steps based on the movement of the CCD camera 640, so that the CCD camera 640 can be shifted to the predetermined position.

Furthermore, the image sensor controller 613 generates a control signal to an aperture mechanism of each of the CCD cameras 620a–620d, 640 to regulate the amount of light incident to the image sensor.

The calculator 617 calculates the amount of curvature aberration of the projected image with reference to the image signal from the end image detector 616. As will be described in detail later, the amount of such a curvature aberration can be calculated by acquiring the boundary between the projected area of a part detected by the end image detector 616, determining the shape of the periphery of the projected area from the location of such a boundary, and calculating the difference with the location of the designed boundary of the project image.

The in-plane illumination calculator 618 calculates an in-plane illumination of the projected image. It acquires the illumination level from the signal generated from the illuminometer 650 as will be described later, storing the illumination level in a memory by bring it correspondence with the input level of other portion to grasp the in-plane illumination of the projected image as a whole.

The 6-axis adjuster controller 614 outputs a control signal to the 6-axis adjuster 460 to adjust the position of the test sheet 450. The 6-axis adjuster controller 614 looks for test patterns formed on the test sheet 450 by the process of pattern matching on an image taken by each of the adjustment CCD cameras 620a–620d. The quality of the focusing condition can be estimated by making a judgment whether the image is appropriately focused or not using a specific indicator (edge strength) of the test pattern from the image data taken.

The 6-axis adjuster controller 614 can be functioned as a means for adjusting a focus by generating a control signal that allows the test sheet 450 to move in the Z-axis direction at the time of focus adjustment as described in later.

The calculator 615 for obtaining the evaluated value of resolution is not shown in the figure. In this embodiment, however, such a calculator 615 may comprise a part for acquiring a background brightness level, a part acquiring a maximum brightness level, for acquiring a minimum brightness level, an input-level calculating part, and an evaluated-value calculating part. The calculator 615 may transmit a control signal to an adjuster for the amount of light in each of adjustment CCD cameras 620a–620d to adjust the amount of receiving light in the adjustment CCD cameras 620a–620d. Alternatively, the calculator 615 may generate a control signal to adjust the amount of receiving light in the measurement CCD camera on the basis of image data detected by the measurement CCD camera 640, or calculating the evaluated value of resolution.

The part for acquiring the background brightness level is provided for acquiring the brightness level Io of a background portion of the test sheet 450, on which any test pattern 10A is not formed, through the measurement CCD camera 640 and the video capturing board.

The part for acquiring the maximum brightness level is provided for acquiring the brightness level Io in the projected image of each of patterns PT1, PT2 for the measurement of resolution. These patterns PT1, PT2 are formed on the test pattern 10A. On the other hand, the part for acquiring the minimum brightness level is provided for acquiring the minimum brightness level Imin in the projected image of each of patterns PT1, PT2. These brightness levels can be acquired through the measurement CCD camera 640 and the video capture board just as in the case with the background brightness level Io.

The input-level calculator is provided for calculating the input level on the basis of the brightness level obtained by each of the respective acquisition parts for background, maximum, and minimum brightness levels.

Specifically, the input-level calculator calculates an input level Ii on the basis of the following equation (1).

$$Ii = Io \times 2 - Imax - Imin \qquad (1)$$

The evaluated-value calculating part is provided for calculating the evaluated value of resolution MTF on the basis of the brightness level obtained by each of the respective acquisition parts for background, maximum, and minimum brightness levels.

Generally, the evaluation value of resolution MTF is provided as a ratio between an input level as an input contrast ratio and an output level as an output contrast ratio of the imaging light, which can be calculated by the following equation (2).

$$MTF = (Imax - Imin)/(Imax + Imin) \qquad (2)$$

In this case, however, when the relationship between the input level and the output level is checked with respect the image obtained by the image-capturing device using the image sensor such as CCD, an offset value (I0% to ICCD0%) is found in the output level. Therefore, if the input level is calculated on the basis of the equation (2) under such an offset condition, the input level can be added twice as much as the offset value, so that the resulting input value can be larger than the actual input level Futhermore, the of the value for the imaging sensor such as CCD may be varied with the variations in the background brightness. For example, the offset value increases as the background brightness level becomes dark. Therefore, the evaluated value of resolution MTF which can be calculated as a result of the above situation becomes smaller than the actual value. Furthermore, the evaluated value of resolution MTF becomes small more and more as the background brightness becomes dark more and more.

For calculating the evaluated value of resolution after making a projected image of each test pattern 10A in the test sheet 450 shown in FIG. 5, the evaluated value of resolution calculated from each of the test patterns 10A cannot be evaluated in the same way as that of other test patterns 10A because the background brightness level becomes small as the test pattern 10A becomes distant from the optical axis of the projector lens.

In this embodiment, therefore, the background brightness level for each test pattern 10A is obtained and is then subjected to a correction by which the offset portion is removed. Specifically, the evaluated-calculating part 25 calculates the evaluated value of resolution MTF on the basis of the following equation (3).

$$MTF = (Imax - Imin)/(Io \times 2 - Imax - Imin) \qquad (3)$$

Thus, the evaluated value of resolution MTF can be obtained from the evaluated-value calculating part through the evaluated-value calculating part using the above equation (3). Therefore, it does not depend on the variations in the background level, so that an appropriate evaluated value of resolution MTF can be obtained, allowing that the evaluation value of resolution calculated from one of the test patterns can be evaluated in the same way as that of another one of the test patterns.

A designed data accumulator 619 in the storage unit 612 is constructed as a data base with a table structure in which the designed data of the test lens 160 is stored. Specifically, a focal distance depending on the model of the projector lens 160, the designed arrangement of the test sheet 450, the designed arrangement of the projected image, or the like can be stored as a single record.

The actual measurement data accumulator 620 is a portion for accumulating the results of evaluation performed on the test lens 160 using the lens-evaluating apparatus of the present embodiment and is constructed as a data base having a plurality of table structures defined for the model of each lens 160. In each table, the record is defined for the production number of each evaluated lens 160. The optical characteristics of the test lens 160, which includes an input level, the evaluated value of resolution, the position of its center focus, the chromatic aberration of its axis, the amount of trapezoidal distortion, the amount of curvature aberration, and so on, can be stored.

Figure 10:
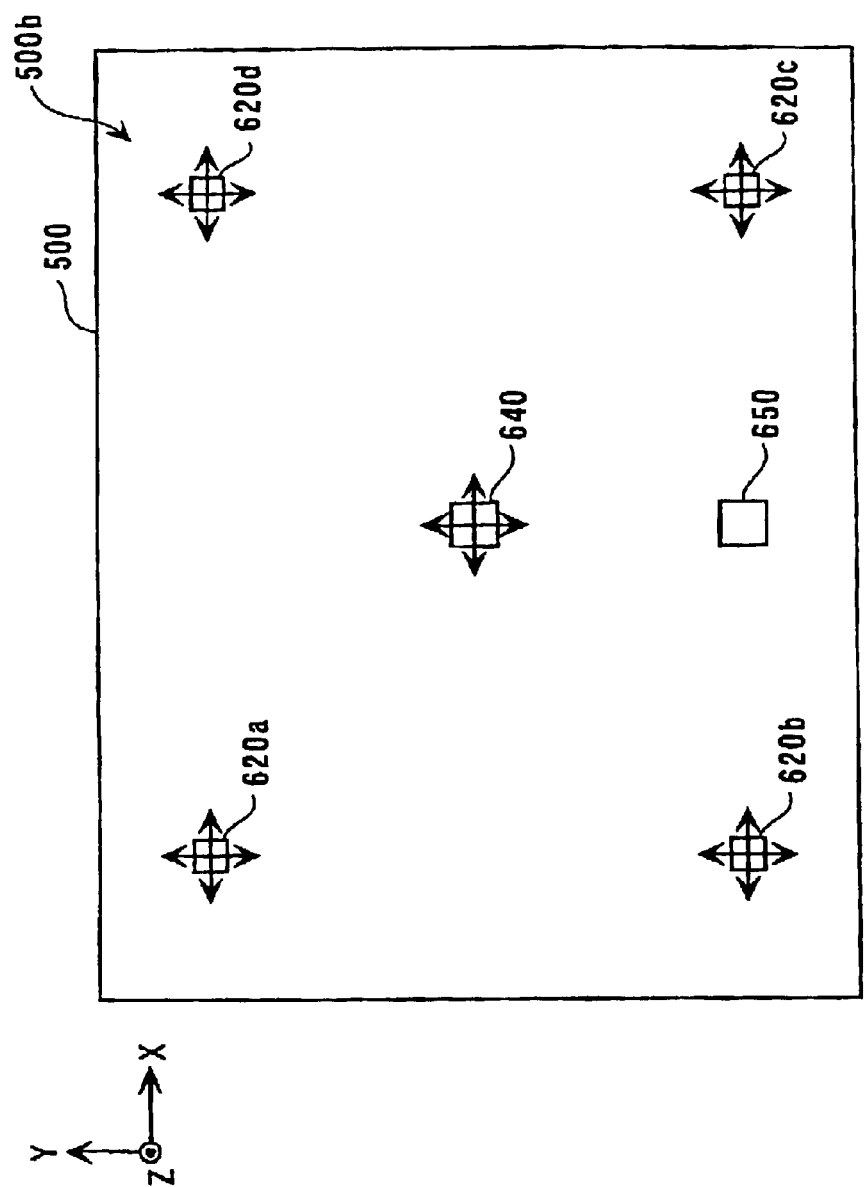
FIG. 10 is a front view for illustrating the arrangement of the illuminometer and the imaging element on the screen in accordance with the above embodiment.

FIG. 10 is an explanatory diagram that illustrates the arrangements of the adjustment CCD cameras 620a–620d, the measurement CCD cameras 640, and the illuminometer 650, which are observed in the +Z direction. As shown in the figure, four adjustment CCD cameras 620a–620d are mounted on four corners of the screen 500, respectively. Each of these cameras 620a–620d is movable within the X–Y plane by a moving mechanism (not shown).

The measurement CCD camera 640 is arranged in the vicinity of the middle of the screen 500 and is also movable within the X–Y plane by a moving mechanism (not shown).

The illuminometer 650 is a device for detecting the illumination of a beam of light emitted from the projector lens 160. The detected level of illumination is outputted to the in-plane illumination calculator 618 of the processor 610 described above.

The illuminometer 650 is arranged on a position corresponding to an optical axis of the test lens 160. Furthermore, as the optical axis of the test lens 160 is varied depending on the lens 160, it can be movable within the X–Y plane by the moving mechanism (not shown).

[3] Method for Evaluating the Quality of Project Lens

Next, we will describe a method for evaluating the quality of a projector lens 160 using the projector lens evaluating apparatus described above.

Figure 11:
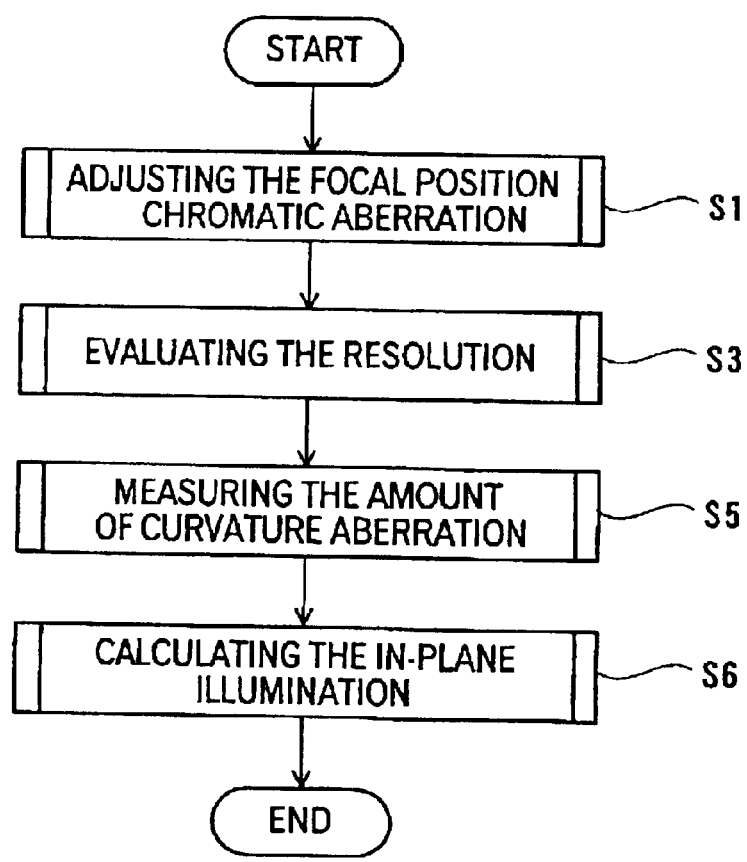
FIG. 11 is a flowchart for illustrating the method for evaluating the quality of a lens in accordance with the above embodiment.

As shown in the flowchart of FIG. 11, the characteristic evaluation of the projector lens 160 is performed in the order of the adjustment of a focal position and the measurement of chromatic aberration (S1), the evaluation of resolution (S3), the measurement of the amount of curvature aberration, and the calculation of in-plane illumination (S6).

[3-1] Adjustment of Focal Position and Measurement of Chromatic Aberration

Figure 12:
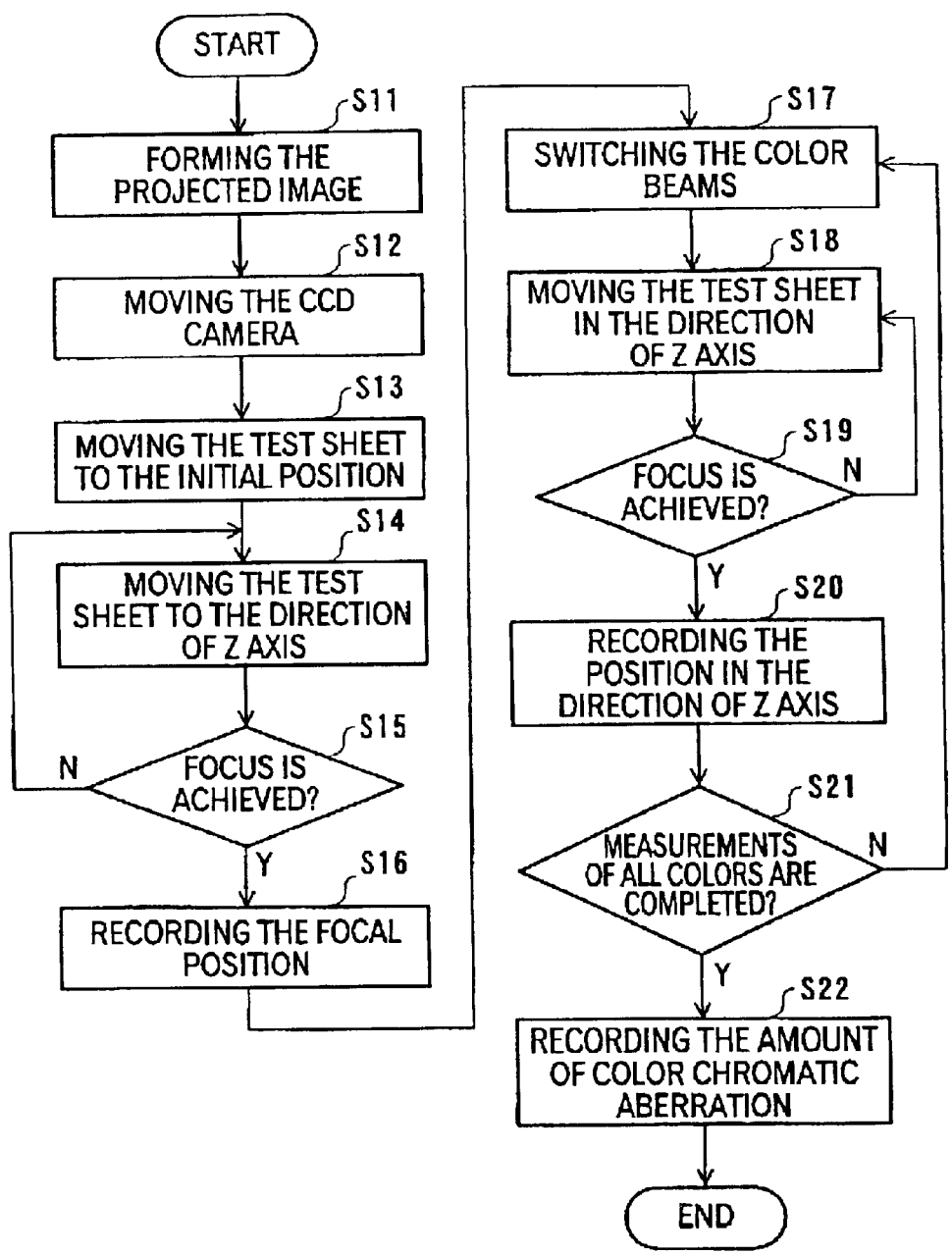
FIG. 12 is a flowchart for illustrating the method for evaluating the quality of a lens in accordance with the above embodiment.

At the step S1, the focal position is adjusted and the chromatic aberration of the test lens 160 is measured. Specifically, the step S1 can be performed in accordance with the flowchart shown in FIG. 12.

At first, the test lens 160 is mounted on a lens-evaluating apparatus. Then, the operator manipulates the processor 610 to specify the model of the test lens 160, resulting in the initiation of a program. Subsequently, the initiated program allows the optical source 410 of the projector 400 to come up. As a result, a projected image is formed on the screen 500 through the test lens 160 (S11: the procedures for illuminating the imaging light).

Next, the image sensor controller 613 evokes the designed data of the test lens 160 from the designed data accumulator 619 to shift the adjustment CCD cameras 620a–620d and the measurement CCD camera 640 to their respective positions corresponding to the designed projected image forming area (S12). Such a procedure allows the adjustment CCD cameras 620a–620d to move to four corners of the projected image, respectively. On the other hand, the measurement CCD camera 640 corresponds to the optical axis of the test lens 160 and moves to the position on which the test pattern 10A is formed.

On the other hand, similar to the above description, the 6-axis adjuster controller 614 generates a control signal on the basis of the designed data and outputs such a signal to the 6-axis adjuster, moving the test sheet 450 to the designed focal position of the test lens 160 (S13). At this time, the test sheet 450 is arranged on a plane perpendicular to the optical axis of the lens 160.

Then, under such a condition, the operator moves the test sheet 450 back and forth in the direction of the optical axis (in the direction of Z axis) of the lens 160 by actuating the 6-axis adjuster controller 614 by the operator (S14) while observing the image of test pattern 10A taken by the measurement CCD camera 640 (S14). Such a movement is repeated until the projected image is brought into focus (S15: step of focus adjustment).

After completing the movement of the test sheet 450 to the back focus position of the lens 160, the processor unit 611 records a positional coordinate in the Z-axis direction associated with the product number of the test lens 160 into the actual measurement data accumulator 620 (S16). Furthermore, it can be stored in the actual measurement data accumulator 620 such that the positional coordinate in the Z-axis direction can be also stored as an absolute magnitude. Alternatively, it may be stored as a deviation in contrast with the positional coordinate in the Z-axis direction or a deviation in contrast with the positional coordinate in the Z-axis direction of the normal lens having averaged characteristics.

Next, the operator actuates the filter carrier 420 to set up a color filter 421 for a predetermined color light beam (S17: step for switching color light beam), initiating the measurement of chromatic aberration on the axis.

Specifically, for example, a green color filter 421 is placed in the optical path of a light beam emitted from the optical source 410 to form a green projected image. Then, the operator observes this image and shifts the test sheet 450 to an appropriate position in the Z-axis direction (S18), allowing the light beam to be focused on the sheet (S19). Such a position in the Z-axis direction is then stored in the memory 10 of the processor unit 611 (S20: step of measuring chromatic aberration).

Subsequently, the operator switches to a red color filter 421 and a blue color filter 421, sequentially. A series of such operations are repeated until the positions in the Z-axis direction corresponding to green, red, and blue beams, respectively (S21).

If all of these positions in the Z-axis direction is obtained, then the deviation of such a position corresponding to each color beams is regarded as the amount of color chromatic aberration and is then assigned to the product number of the test lens 160, followed by storing in the actual measurement data accumulator 620 by the processor unit 611 (S22)

[3-2] Evaluation of Resolution

Figure 13:
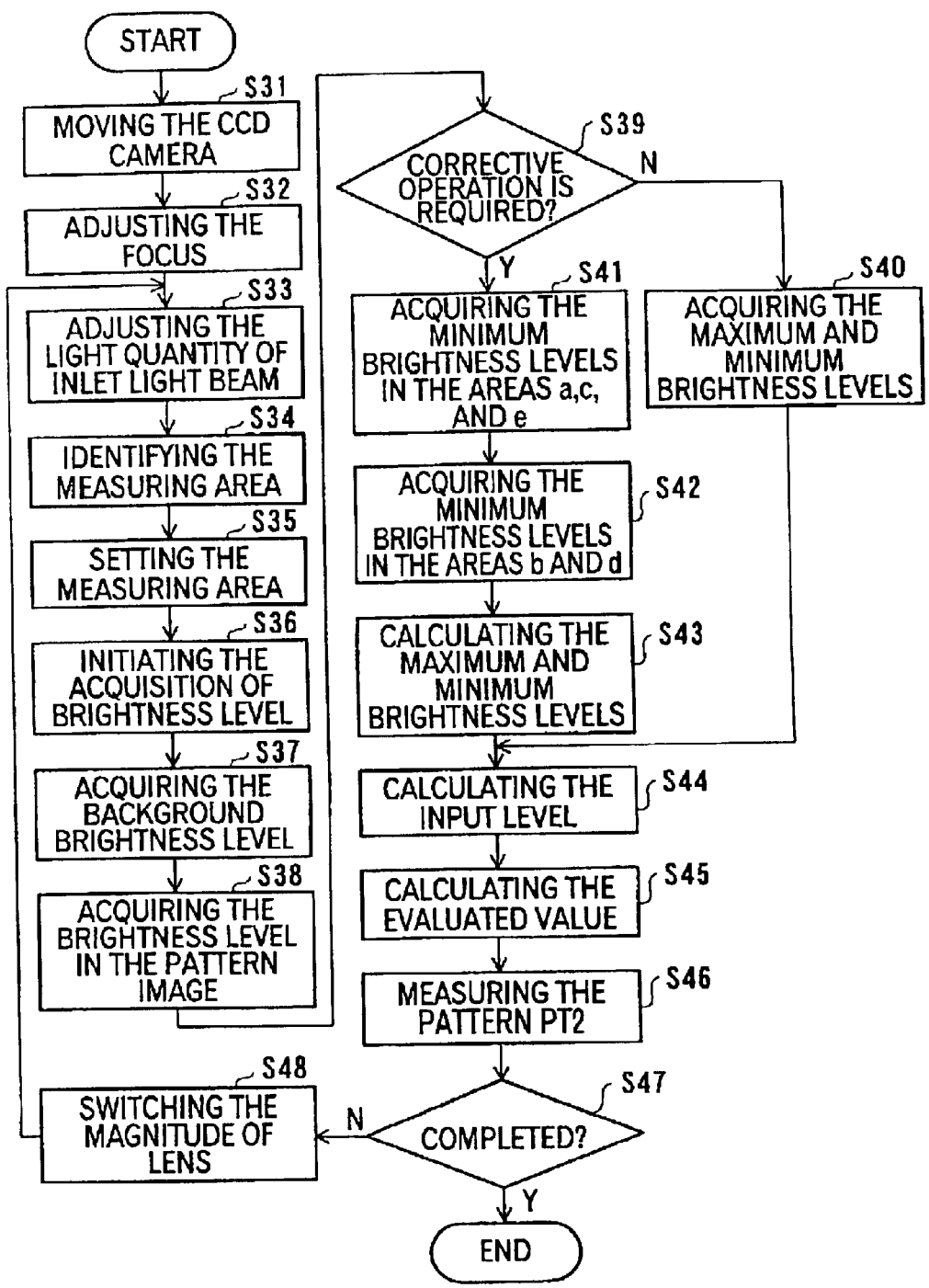
FIG. 13 is a flowchart for illustrating the method for evaluating the quality of a lens in accordance with the above embodiment.

The evaluation of resolution is performed in accordance with a flowchart shown in FIG. 13.

(1) The image sensor controller 613 moves the measurement CCD camera 640 to a position where the CCD camera 640 can be allowed to detect an image of a test pattern 10A for the measurement of resolution (S31). Subsequently, the focus of the measurement CCD camera 640 is adjusted on the image (S32), while the amount of light incident to the image sensor in the CCD camera 640 (S33). Furthermore, the light intensity is adjusted for the measurement to be performed on a portion in a proportionality relation of output with respect to the detected brightness level of the CCD camera 640.

Figure 14:
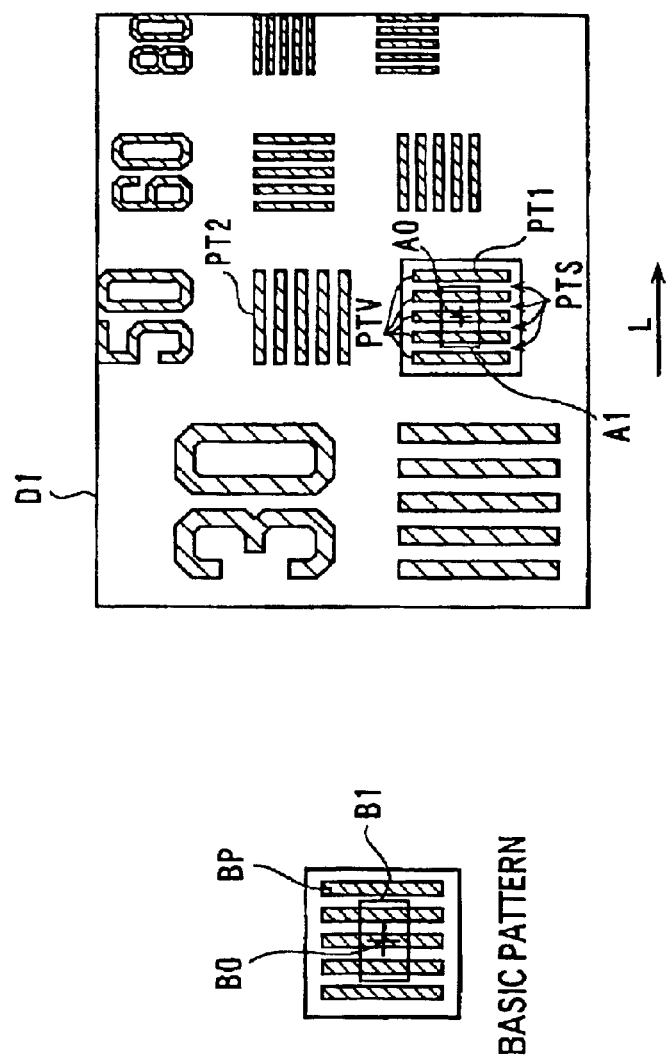
FIG. 14 is a flowchart for illustrating the method for evaluating the quality of a lens in accordance with the above embodiment.

(2) Next, the calculator 615 for obtaining the evaluated value of resolution identifies a pattern PT1 for the calculation of such a value (S34). The identification is performed by a pattern matching as one of the procedures used for image processing. As shown in FIG. 14, among a plurality of patterns PT1 to be represented in an image D1 taken by the measurement CCD camera 640, one similar to the basic pattern BP stored in the hard disk is searched as shown in FIG. 14.

(3) In the basic pattern BP, a position of the center BO of the pattern and an area B1 based on such a center BO are set. Therefore, as a result of the pattern matching, a center coordinate AO of the pattern PT1 corresponding to the center BO of the pattern is returned to set a measuring area A1 for obtaining the evaluated value of resolution (S35).

(4) The acquisition of a brightness level of an image in the measuring area A1 set at the above step S35 is initiated (S36: The step for detecting imaging light). The image processing in the processor 610 of the present embodiment is capable of representing the brightness of an image with 256 levels of gray where a most dark portion is defined as a level of 0 while a most bright portion is defined as a level of 255.

(5) At first, the test sheet 450 is slightly shifted to displace the pattern PT1 from the measuring area A1. Under such a condition, the measurement is performed on the image in the measuring area A1 to acquire the brightness level Io of the background portion (S37). The acquisition of the brightness level Io is performed such that the value obtained by averaging the brightness levels of all of the measuring points in the measuring area A1 is used as a central value. Then, the brightness level Io is stored in the memory in the processor unit 611.

(6) Next, the pattern PT1 is returned to the inside of the measuring area to measure a brightness level of the pattern PT in the image taken by the measurement CCD camera 640 (S38). Specifically, if the brightness level of the pattern PT1 shown in FIG. 14, the brightness level detected on a pixel line in the extending direction of a shading area PTV is integrated. Then, the resulting value is divided by the number of pixels being integrated, and the result of the division is then provided as a central value of the brightness level on the one pixel line in the extending direction of the shading area PTV. Such a process is repeated one by one in the direction along which the shading areas PTV and translucent areas PTS are arranged, i.e., in the L direction in FIG. 14, to acquire the central value of the brightness level of each shading area PTV in the measuring area A1 and that of each translucent area PTS in the shading area PTS.

Figure 15:
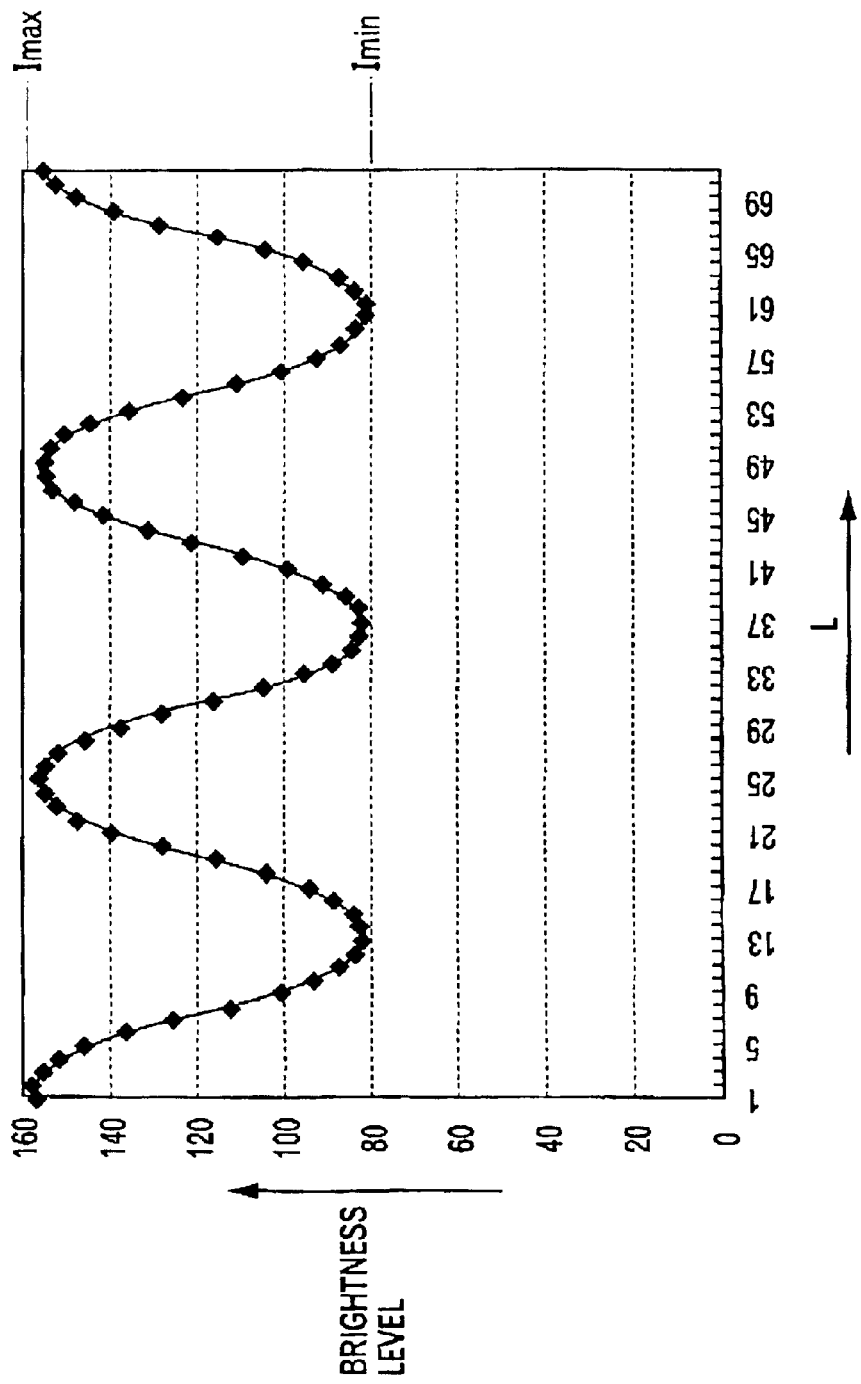
FIG. 15 is a graph for obtaining the evaluated value of resolution by the method for evaluating the quality of a lens in accordance with the above embodiment.

(7) The calculator 615 for obtaining the evaluated value of resolution makes a judgment whether a second corrective operation is required with reference to the central value of the obtained brightness level at each line (S39). That is, if the brightness levels of the background in the measuring area A1 are equal to each other, then the distribution of brightness levels in the direction along which the shading areas PTV and the translucent areas PTS can be represented as a certain periodic pattern in FIG. 15 such that the minimum brightness levels Imin and the maximum brightness levels Imax are equalized, respectively. Therefore, the maximun brightness level Imax and the minimum brightness level Imin can be acquired as shown in FIG. 15 without the need of any corrective operation, respectively (S40; the acquisition of maximum and minimum brightness levels).

Figure 16:
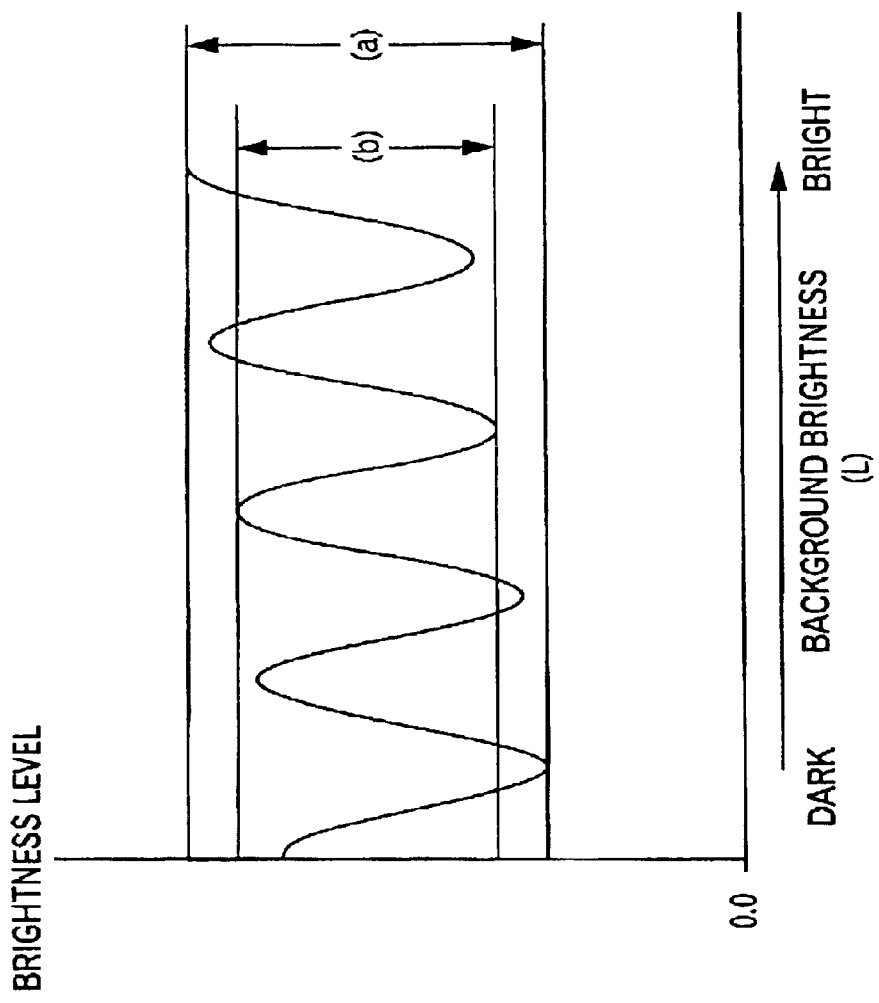
FIG. 16 is a graph for obtaining the evaluated value of resolution by the method for evaluating the quality of a lens in accordance with the above embodiment.
Figure 17:
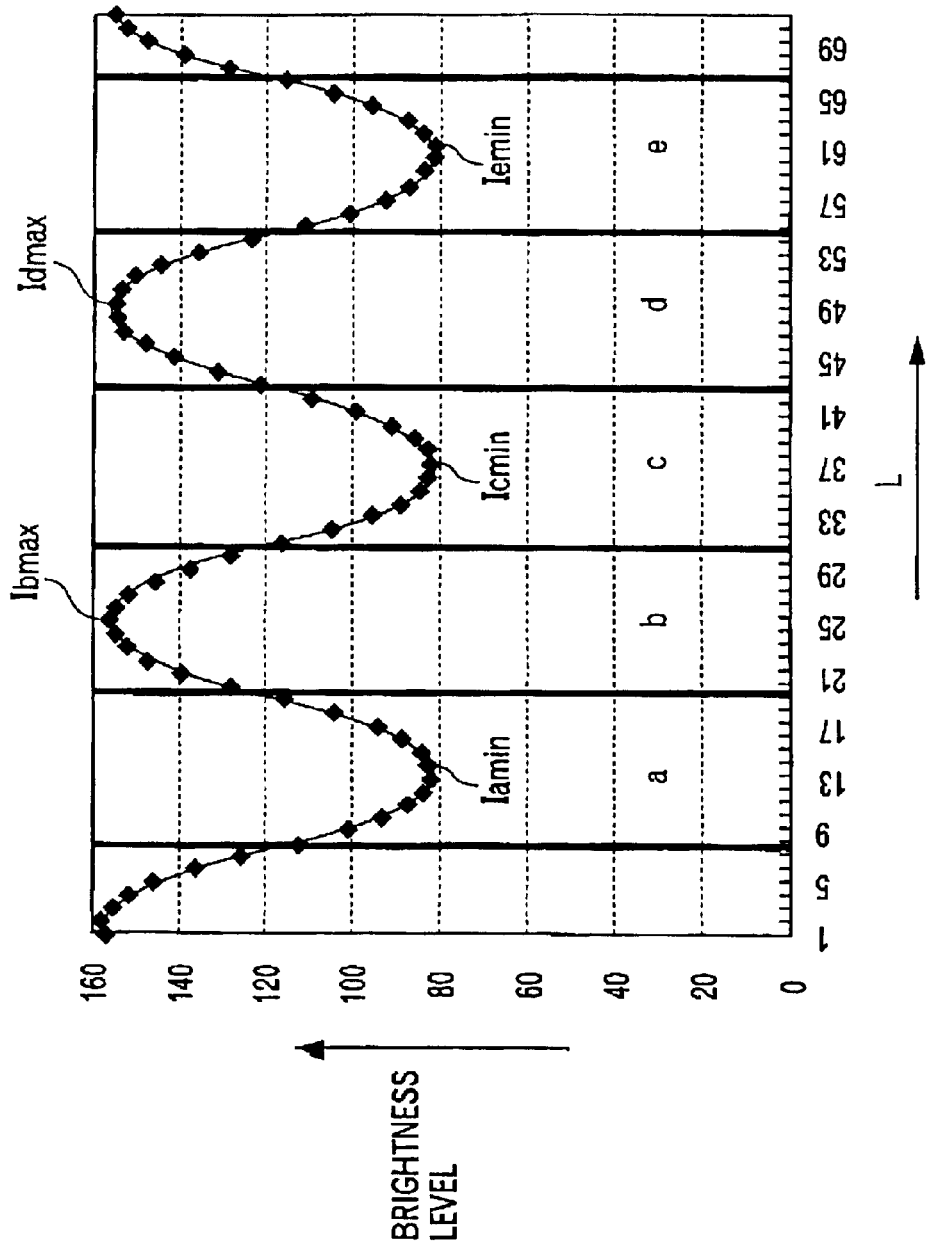
FIG. 17 is a graph for obtaining the evaluated value of resolution by the method for evaluating the quality of a lens in accordance with the above embodiment.

(8) On the other hand, if the brightness levels of the background in the measuring area A1 are not equalized, the distribution of brightness levels becomes large as it gets close to the middle of the projected image. For example, as shown in FIG. 16, considering that the difference between the maximum and minimum brightness levels is gradually increased with the variations in the brightness levels of the background in the measuring area A1, the correct minimum and maximum brightness levels are hardly obtainable when these levels are defined within the range (a) of brightness as described above as the variations in the background brightness is set aside. Therefore, for obtaining the minimum and maximum brightness levels within a more appropriate range (b) of brightness, the calculator 615 for obtaining the evaluated value of resolution divides the measuring area A1 into smaller areas a to e. In these areas a to e, as shown in the graph of FIG. 17, among the minimum brightness levels found in the respective areas a, c, and e, the minimum brightness levels Iamin, Icmin, and Iemin are acquired (S41). On the other hand, among the maximum brightness levels found in the respective areas b and d, the maximum brightness levels Ibmax and Idmax are acquired (S42).

(9) After the acquisition of the minimum brightness levels Iamin, Icmin, and Iemin and the maximum brightness levels Ibmax and Idmax in the respective areas a to e, the calculator 615 acquires the maximum brightness level Imax and the minimum brightness level Imin by substitutions f the minimum and maximum brightness levels into the respective areas in the equations (4) and (5) (S43: Step of acquiring the maximum and minimum brightness levels).

$$I\max=(Ib\max+Id\max)/2 \quad (4)$$

$$I\min=(Ia\min+Ic\min+Ie\min)/3 \quad (5)$$

Furthermore, the number of denominator s in each of the above equations (4) is defined by the number of areas having the maximum brightness levels among the divided areas, while the number of denominator s in each of the above equations (4) is defined by the number of areas having the minimum brightness levels. The number of each of denominators and nominators may be appropriately varied depending on the variations in the spatial frequency of pattern PT1 for the measurement of resolution.

(10) After acquiring the background brightness level Io, the maximum brightness level Imax, and the minilum brightness level Imin as described above, the calculator 615 for obtaining the evaluated value of resolution calculates an input level Ii from the equation (6) (S44: Step for the calculation of input level) and also calculates the evaluated value of resolution MTF (S45: step for the calculation of evaluated value). The results of these calculations are stored in the actual measurement data accumulator 620 to which the positional coordinate where the evaluation of resolution has performed and the product number of the test lens 160 are assigned.

$$Ii=Io\times 2-I\max-I\min \quad (6)$$

$$MTF=(I\max-I\min)/Ii \quad (4)$$

(11) The measurement of the brightness level of pattern PT2 and the calculation of the evaluated value of resolution (S46). Furthermore, the same measurement and the calculation of evaluated value are repeated for all of the test patterns 10A in the test pattern TP shown in FIG. 5.

(12) In addition, each of the steps described above is performed at the maximum magnification of the test lens 160 at first, and then it is repeated at the minimum magnification thereof (S47).

[3-3] The Measurement of Curvature Aberration

Figure 18:
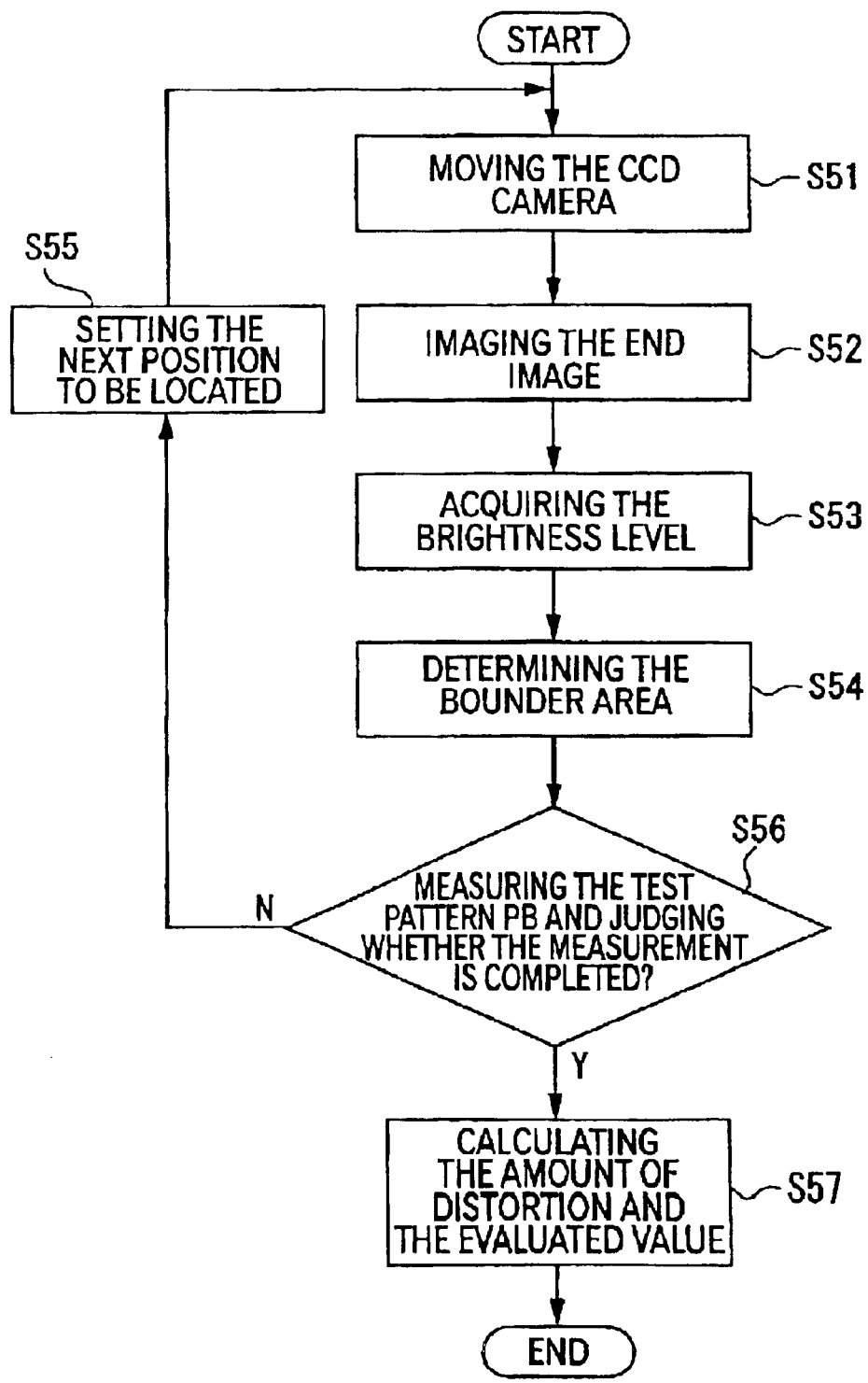
FIG. 18 is a flowchart for illustrating the method for evaluating the quality of a lens in accordance with the above embodiment.

The measurement of curvature aberration is performed according to the flowchart shown in FIG. 18.

(1) The image sensor controller 613 shifts the adjustment CCD cameras 620a–620d to their respective initial positions with control signals on the basis of designed data stored in the designed data accumulator 619 (S51).

(2) The end-image detector 616 identifies each of the test patterns PA1–PA4 respectively formed on four corners of the imaging area to detect an image of the target test pattern (step for the acquisition of end image). Here, the identification of the test pattern image may be automatically performed using a pattern matching which is one of the procedures generally used in the image processing.

(3) The calculator 617 for obtaining the amount of curvature aberration acquires the brightness level of the image detected by the end-image detector 616 (S53). As shown in FIG. 7(a), the acquisition of brightness level is performed on the basis of the designed data stored in the designed data accumulator 619, such that the brightness levels are acquired at 1-pixel lines AX, AY in the X-axis and Y-axis directions, respectively.

Figure 19:
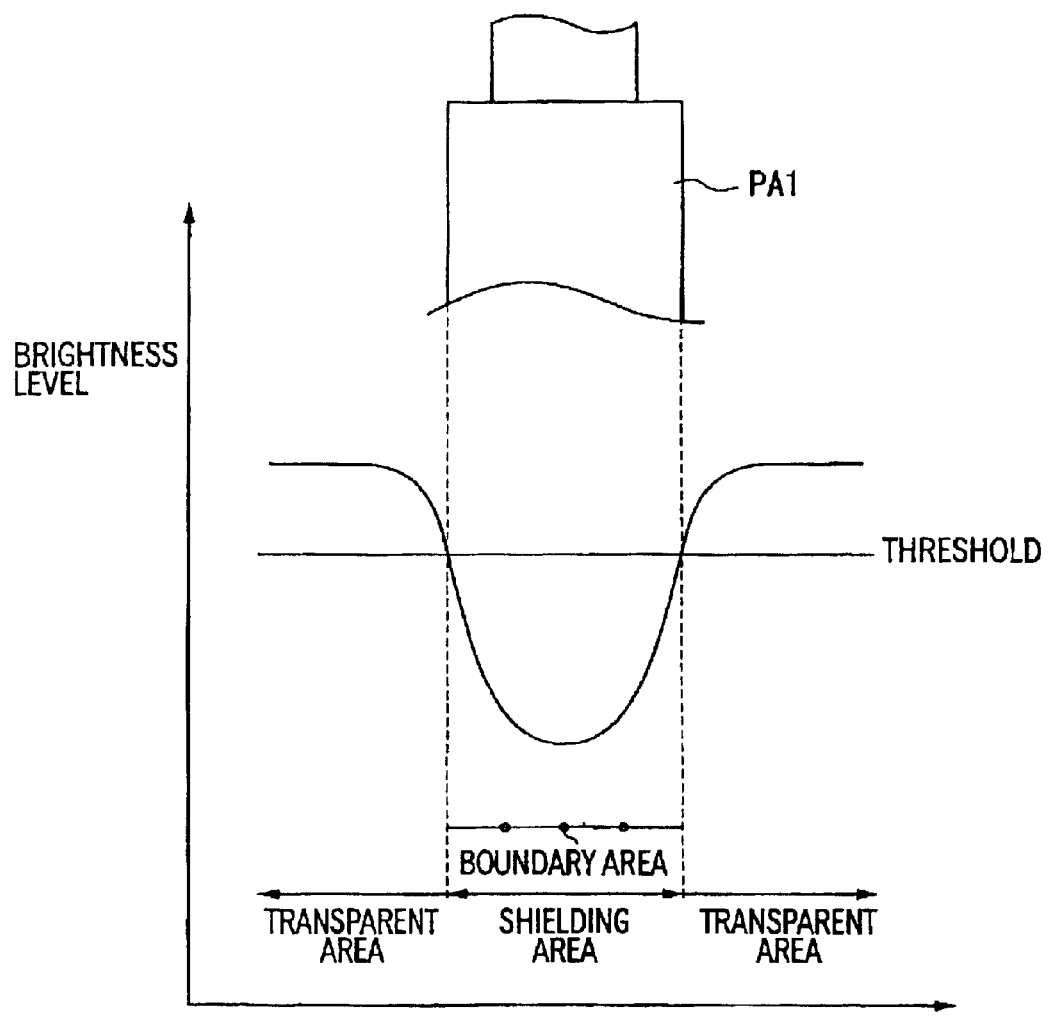
FIG. 19 is a schematic diagram that illustrates the calculation of the amount of curvature aberration in the method for evaluating the quality of a lens in accordance with the above embodiment.

(4) The calculator 617 for obtaining the amount of curvature aberration determines the boundary area from the acquired brightness level (S54). As shown in FIG. 19, the shading area of the test pattern is calculated from the acquired brightness level and the threshold of the predetermined brightness level. The coordinate correspond to the middle of the shading area is identified as a boundary area and is then stored in the actual measurement data accumulator 620 while being assigned with the position of test pattern.

Figure 7B:
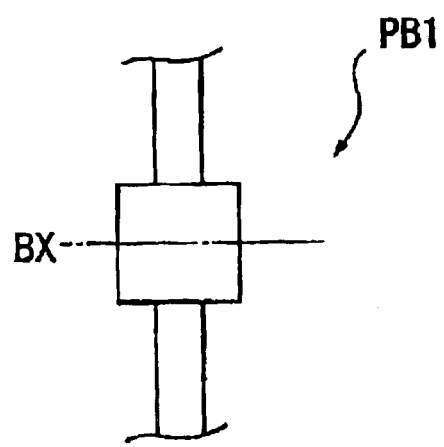

(5) The image sensor controller 613 shifts the position of the measurement CCD camera 640 by the output of a control signal on the basis of designed data stored in the designed data accumulator 619 (S55: Step for the movement of image sensor). Then, the imaging of each test pattern PB, the acquisition of brightness level, and the determination of boundary area are performed by the same procedures as described above. Also, the test patterns are measured in order of PB1–PB12. Furthermore, the calculator 617 for obtaining the amount of curvature aberration makes a judgment whether the determinations of boundary areas at all of the test patterns PB1–PB12 on the basis of coordinate data of the above test patterns stored in the designed data accumulator 619, respectively (S56). If the determinations are not performed all of these positions, the next measuring position is set and a control signal is ten transmitted to the imaging sensor controller 613 on the basis of the predetermined amount of the movement. Here, as shown in FIG. 7(b), the acquisition of the brightness level of test pattern PB is performed on one pixel line perpendicular to the side edge of the rectangular shading portion 10B.

(6) the calculator 617 for obtaining the amount of curvature aberration calculates the amount of distortion and the amount of curvature aberration of the projected image on the basis of all of coordinate data of the test patterns PA and PB stored in the actual measurement data accumulator 620 (S57: Step for the calculation of curvature aberration).

Figure 20:
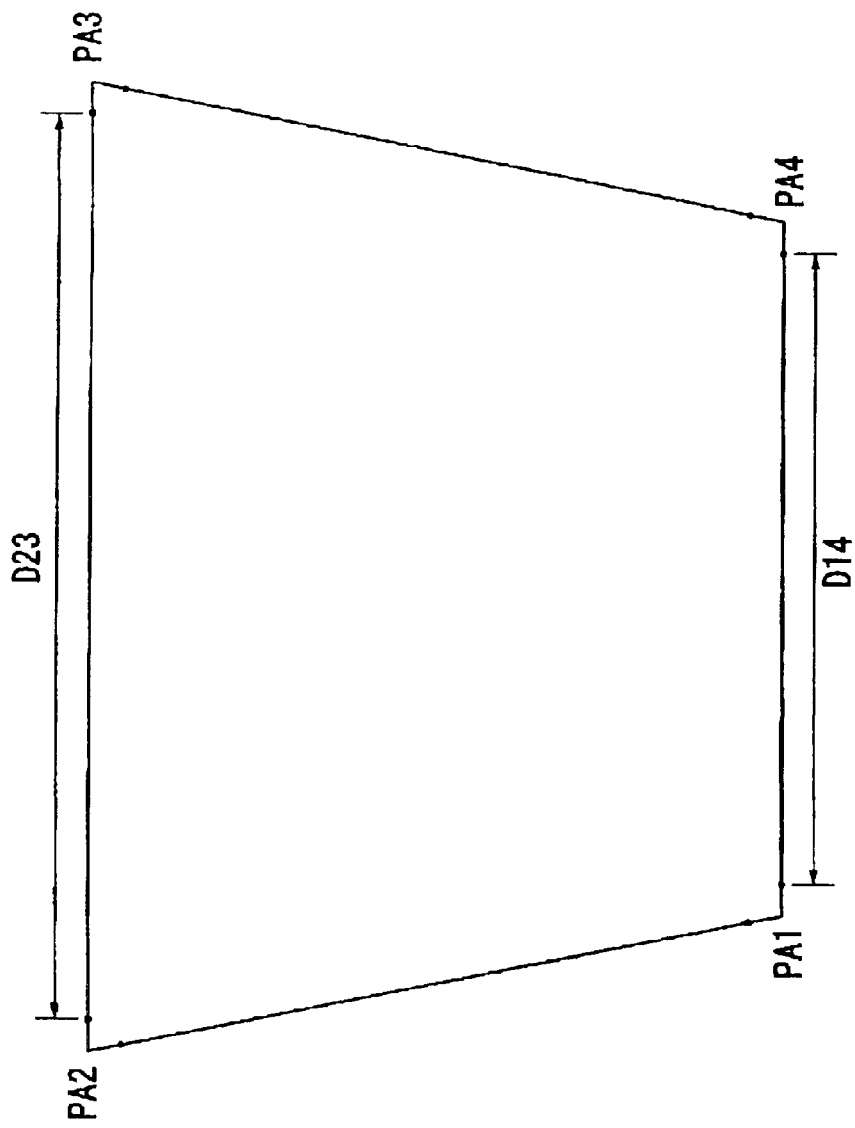
FIG. 20 is a schematic diagram that illustrates the calculation of the amount of trapezium distortion in the method for evaluating the quality of a lens in accordance with the above embodiment.

Specifically, the amount of distortion of the projected image is calculated on the basis of coordinate data of test patterns PA1–PA4 respectively formed on four corners as shown in FIG. 20.

The calculator 617 for obtaining the amount of curvature aberration calls out the above coordinate data of test patterns PA1–PA4 stored in the actual measurement data accumulator 620. Then, the distance D23 between the coordinate calculated for the test pattern PA2 and the coordinate calculated for the test pattern PA3, and the distance D14 between the coordinate calculated for the test pattern PA1 and the coordinate calculated for the test pattern PA4, followed by obtaining the amount of distortion $\epsilon 1$ (%) from the following equation (8).

$$\epsilon 1 (\%) = 100 \times (D23 - D14)/(D23 + D14) \quad (8)$$

Figure 21:
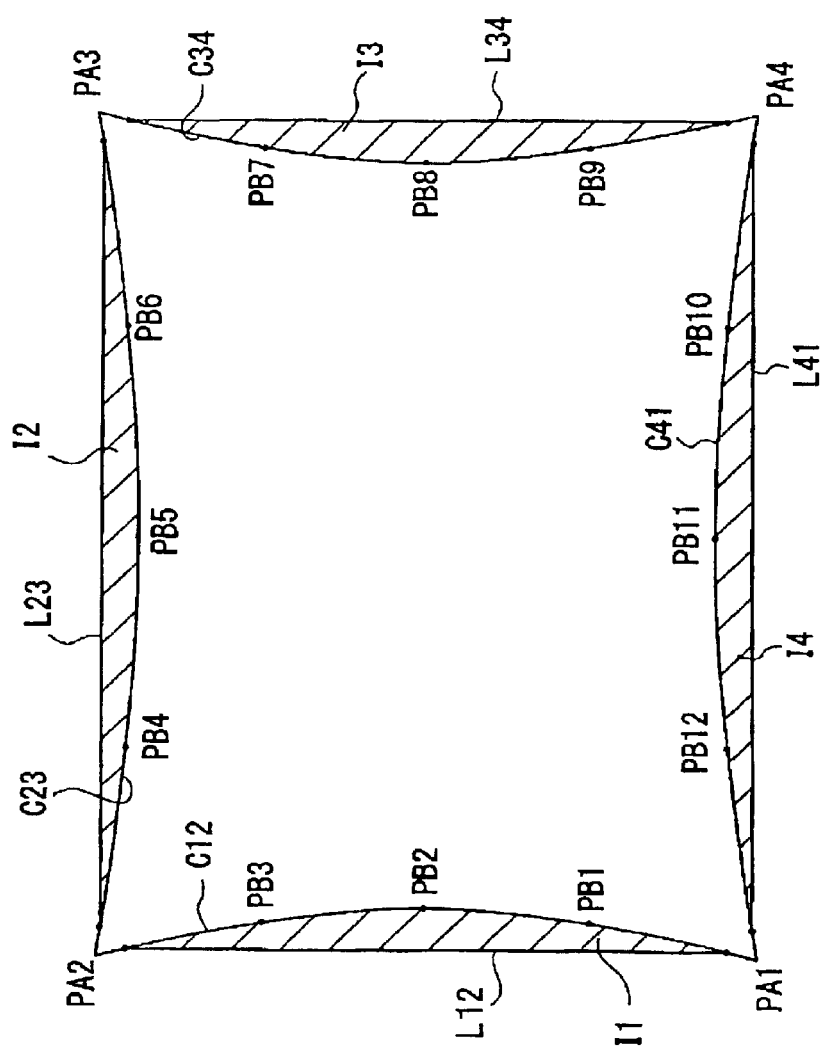
FIG. 21 is a schematic diagram that illustrates the calculation of the amount of curvature aberration in the method for evaluating the quality of a lens in accordance with the above embodiment.

In addition, as shown in FIG. 21, the amount of curvature aberration is calculated on the basis of all coordinate data obtained for the test patterns PA1–PA4 and PB1–PB12.

The calculator 617 for obtaining the curvature aberration calls out coordinate data of test patterns PA1–PA4 and PB1–PB12 stored in the actual measurement data accumulator 620. Then, each of approximated curves C12, C23, C34, and C41 are calculated using the coordinate data obtained at the respective five points for every edge of the projected image. In addition, the straight lines L12, L23, L34, and L41 are calculated on the basis of the coordinate data of test patterns PA1–PA4. Furthermore, the areas I1, I2, I3, and I4 are surrounded by their respective closed curves formed by four approximated curves and four lines calculated as described above, respectively. Then, the amount of curvature aberration$\epsilon 2$ (%) is calculated using the following equation (9).

$$\epsilon 2 = 100 \times (I1 + I2 + I3 + I4)/10 \quad (9)$$

Here, if the distortion is fonned like a bobbin as shown in FIG. 21, the amount of curvature aberration $\epsilon 2$ (%) can be resulted in a minus. On the other hand, the distortion is formed like a barrel, the amount of curvature aberration $\epsilon 2$ (%) can be resulted in a plus.

(7) The calculator 617 for obtaining the amount of curvature aberration stores the amount of the distortion of the image and the amount of the curvature aberration of the projector lens 160, which are calculated as described above and assigned with the product number of the test lens 160, in the actual data accumulator 620.

[3-4] Calculation of In-plate Illuminance

Figure 22:
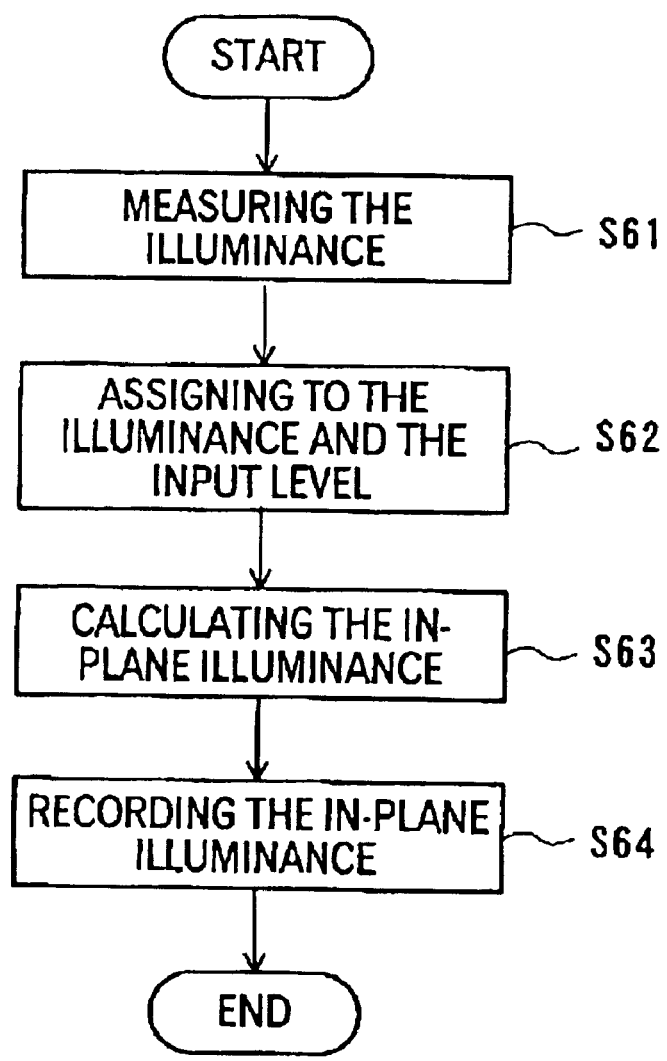
FIG. 22 is a flowchart for illustrating the method for evaluating the quality of a lens in accordance with the above embodiment.

The calculation of in-plane illuminance of the projected image can be performed according to the flowchart shown in FIG. 22.

(1) The illuminometer 650 measures an illuminance Lo of the test pattern 10A positioned at the middle of the lower edge (S61: Step for acquiring the illuminance of the predetermined position). The calculator 618 for calculating the in-plane illuminance calls out input level data stored in the actual measurement data accumulator 620, followed by assigning the data with the input level Iio obtained at the position of the above test pattern 10A (S62).

(2) The calculator 618 for obtaining the in-plane illuminance further calculates the illuminance Le of each of other positions using the following formula (10) on the basis of the input level Iie at the position and the illuminance Lo and the input level Iio of the test pattern 10A (S63: Step for the calculation of in-plane illuminance).

$$Le = Lo \times Iie/Iio \quad (10)$$

(3) The calculator 618 for obtaining the in-plane illuminance stores the obtained in-plane illuminance in the actual data accumulator 620 while assigning with the product number of the projector lens 160 (S64).

[4] Advantages of the Embodiment

The embodiment described above has the following advantages.

As the method of the above embodiment has the step S15 of adjusting the focus of the projector lens 160, the evaluated value of resolution MTF can be calculated on the basis of imaging light detected under the condition in which the position of the test sheet 450 is adjusted to the focal position of the test lens 160. Therefore, it becomes possible to correctly calculate the evaluated value of resolution by preventing the image from out of focus or the like due to a bend in the back-focal surface of the lens 160 or the like.

In addition, for focal adjustment of each lens 160, the deviation obtained by shifting the test sheet 450 in the direction along the optical axis may be recorded to estimate the variation in the process of manufacturing individual lens 160, allowing the operator to grasp the optical characteristics of the lens 160 with a high degree of accuracy.

Furthermore, as the method has the step S17 of switching color light beams and the step S20 of measuring chromatic aberration, the optical characteristics of the lens 16 can be measured with a high degree of accuracy because of the measurement of chromatic aberration in addition to evaluate the resolution of the test lens 160.

Furthermore, there is no need to form an additional pattern for the measurement of chromatic aberration on the test sheet 450, so that the test pattern 10A on the test sheet 450 can be simplified.

Furthermore, the evaluation of resolution can be performed at the minimum and maximum magnifications of the lens 160. Therefore, the resolution of a scalable combination of lenses 160 can be evaluated even if it is scaled up or scaled down with a high degree of accuracy.

Furthermore, as the method has the step S55 of moving the image sensor, the step S52 of acquiring the end image, and the step S57 of calculating the amount of curvature aberration, so that the end image can be acquired at the predetermined position by moving the measurement CCD camera 640 along the outer peripheral end of the projected image on the screen 500. Therefore, the end image can be acquired at any position on the projected image and the curvature aberration can be then calculated by contrast with the designed image-projecting position, allowing the evaluation of curvature aberration of the lens with a high degree of accuracy.

Furthermore, as the image of the frame-shaped shading portion 10B is acquired by the step for the acquisition of the end image, the brightness levels of the image of the shading portion 10B can be obtained within the range between the bright area on the outside of the frame-shaped portion 10B and the bright area on the inside of the shading portion 10B, the predetermined brightness level can be used as a threshold to grasp positions corresponding to such a threshold, by which the frame-shaped portion is sandwiched. Therefore, the middle point is calculated from these positions, so that the coordinates of the middle of the image of the shading portion 10B can be easily grasped. Thus, such coordinates can be used to acquire the amount of aberration with a high precision in contrast to the designed value and to evaluate the curvature aberration of the lens can be evaluated with a higher degree of accuracy.

Furthermore, the illuminance at other position can be calculated on the basis of input levels of a plurality of positions only by acquiring the illuminance at a predetermined position through the illuminometer 650. Therefore, the in-plane illuminance of the projected lens can be acquired by the measurement of illuminance only at one predetermined position in the projected image, grasping the optical characteristics of the lens 160 with a higher accuracy.

In the embodiment described above, furthermore, the evaluation of resolution performs a corrective operation to cancel the offset to be caused by the characteristics of the CCD camera 640 or the video capture board Therefore, the evaluated value of resolution MTF can be calculated more precisely without depending on the background brightness of the projected image.

[5] Modified Embodiment

The present invention is not limited to the embodiment described above. The present invention may include the following modifications without departing from the scope thereof.

In the above embodiment, means for adjusting the light intensities of the CCD cameras 620a–620d and 640 is used for keeping the proportional relationship between the brightness level of light incident to the image sensor and the output signal. According to the present invention, it is not limited to such a configuration of the above embodiment. That is, if the background brightness level has varied, the light intensities of light incident to the image sensors of the respective CCD cameras 620a–620d and 640 on the basis of the above variation may be adjusted using the above means for adjusting the light intensity so as to keep the light intensity of light incident to the image sensor without being influenced by the background brightness level.

In the above embodiment, the corrective operation is performed on the evaluated value of resolution using the background brightness level. According to the present invention, however, it is not limited to such a configuration of the embodiment. Alternatively, the evaluation of resolution without performing the corrective operation can be adapted in the present invention. Furthermore, the present invention is not limited to a specific equation when the corrective operation is performed. The present invention may apply on the case using any equation appropriate to the measuring conditions.

In the above embodiment, furthermore, the present invention is used for evaluating the optical characteristics of the projector lens 160. According to the present invention, however, it is not limited to such an application. The present invention may be applied on other optical system that constitutes the projector or used in other apparatuses except the projector.

In the above embodiment, furthermore, the parallel patterns PT1, PT2 for the evaluation of resolution is used. Alternatively, the present invention may use another pattern for the evaluation of resolution on the basis of sinusoidal response function by which the pattern of light and dark on the image is gradually changed. Furthermore, the present invention may be used for the patterns to be applied on other resolution evaluating procedures.

In the above embodiment, at the time of calculating the amount of curvature aberration, it is calculated on the basis of the shape of the shading portion 10B of the test sheet 450 displayed on the screen 500 but not limited to. Alternatively, the amount of curvature aberration may be calculated from the rectangular projected image. In the above embodiment, furthermore, the amount of curvature aberration of the projector lens 160 is obtained from the coordinates at eight points in total on the shading portion 10b of the test sheet 450 displayed on the screen 500. However, it is not limited to such a configuration. The amount of curvature aberration may be calculated from the shape of the shading portion 10B. Alternatively, it may be calculated using other methods.

Furthermore, other configuration, shape, and so on may be specifically applied for embodying the present invention within the scope of the invention to attain the object thereof.

What is claimed is:

1. A method for evaluating the quality of a lens, comprising:

illuminating imaging light on a screen through the lens to form a projected image, where the imaging light having a test-pattern image is generated using a test sheet on which a test pattern for measuring a resolution of the lens is formed to evaluate the resolution of the lens;

detecting a brightness of the test-pattern image displayed on the screen by an image-capturing device using an imaging sensor;

calculating an input level on the basis of the detected brightness of the test-pattern image;

calculating an evaluated value of resolution; and adjusting a position of the test sheet to a position corresponding to a focus of the lens by detecting the test-pattern image while moving the test sheet back and forth in the direction along an optical axis of the lens.

2. A method for evaluating the quality of a lens as claimed in claim 1, further comprising:

switching the imaging light including the test-pattern image into a plurality of color light beams; and measuring a chromatic aberration of the lens on an optical axis thereof by detecting a plurality of imaging light beams corresponding to the plurality of color light beams being switched.

3. A method for evaluating the quality of a lens as claimed in claim 1, wherein the lens is constructed as a lens assembly in which a plurality of converging elements is arranged in the direction along the optical axis of the lens, a zooming mechanism is provided for allowing the projected image to be scaled up or down by changing a relative position of each of the converging elements, and the steps of illuminating the imaging light, detecting the imaging light, calculating the input level, and calculating the evaluated value are performed at least at a minimum magnitude of the lens and a maximum magnitude of the lens.

4. A method for evaluating the quality of a lens as claimed in claim 1, wherein the imaging element is constructed so as to be movable along the surface of the screen, and the method further comprises the steps of:

moving the imaging element along an outer peripheral end of the project image on the screen;

acquiring an end image by the image-capturing device using the imaging element at a predetermined position during the movement of the imaging element by the step of moving the imaging element; and calculating the amount of curvature aberration of the projected image on the basis of the end image of the projected image acquired by the step of acquiring the end image.

5. A method for evaluating the quality of a lens as claimed in claim 4, wherein the test sheet includes a flame portion formed in the vicinity of a periphery of an area on which the projecting image is formed, the step of acquiring the end image acquires an image of the frame portion formed on the screen.

6. A method for evaluating the quality of a lens as claimed in claim 1, wherein the steps of illuminating the imaging light, detecting the imaging light, calculating the input level, and calculating the evaluated value are performed on a plurality of positions within the projected image, and the method further comprises the steps of:

acquiring an illuminance at a predetermined position, on which the steps of illuminating the imaging light, detecting the imaging light, calculating the input level, and calculating the evaluated value are performed, in the projected image; and calculating an in-plane illuminance of the whole projecting image by calculating an illuminance of other position on the basis of the input level and the illuminance of the predetermined position and an input level of other position.

7. A method for evaluating the quality of a lens as claimed in claim 6, wherein the illuminance Le of the other position is obtained by an equation of:

$$Le = Lo \times Iie / Iio$$

wherein

Iie denotes an input level of the other position, Iio denotes an input level of the predetermined position, and Lo denotes an illuminance of the predetermined position.

8. An apparatus for evaluating the quality of a lens, comprising:

a test sheet on which a test pattern for evaluating a resolution of a lens is formed;

a light source for introducing imaging light into the lens by illuminating light on the test sheet, where the imaging light includes a test-pattern image generated by the test pattern;

a screen on which the imaging light illuminated from the lens is projected;

an image sensor for imaging the test-pattern displayed on the screen;

an image-capturing part for generating an image signal by capturing an image taken by the image sensor; and a signal-processor including a calculator for obtaining an evaluated value of resolution, in which an input level and the evaluated value of resolution are computed on the basis of the image signal outputted from the image-capturing part, wherein the signal-processor has a means for adjusting a position of the test sheet to a position corresponding to a focus of the lens by detecting the test-pattern image while moving the test sheet back and forth in the direction along an optical axis of the lens.

9. An apparatus for evaluating the quality of a lens as claimed in claim 8, further comprising:

a switching part for switching the imaging light including the test-pattern image into a plurality of color light beams; and a measuring part for measuring a chromatic aberration of the lens on an optical axis thereof by detecting a plurality of imaging light beams corresponding to the plurality of color light beams being switched.

10. An apparatus for evaluating the quality of a lens as claimed in claim 8, further comprising:

a mechanism for moving the imaging element along the surface of the screen, wherein the signal processor includes:

an imaging element controller for controlling a movement of the imaging element along an outer peripheral end of the projected image on the screen;

an end image detector for acquiring an end image by the image-capturing device using the imaging element at a predetermined position during the movement of the imaging element by the imaging element controller; and calculator for calculating the amount of curvature aberration of the projected image on the basis of the end image of the projected image acquired by the end image detector.

11. An apparatus for evaluating the quality of a lens as claimed in claim 10, wherein the test sheet includes a flame portion formed in the vicinity of a periphery of an area on which the projecting image on the screen is formed.

12. An apparatus for evaluating the quality of a lens as claimed in claim 8, further comprising:

an illuminometer that detects an illuminance of a predetermined position in the projected image.

13. An apparatus for evaluating the quality of a lens as claimed in claim 12, wherein the acquisition of an input level by the calculator for obtaining the evaluated value of resolution is performed at each of a plurality of positions in the projected image including a predetermined position where the illuminance is detected, and the signal processor includes a calculator for calculating an in-plane illuminance of the whole projecting image by calculating an illuminance of other position on the basis of the illuminance of the predetermined position detected by the illuminance detector, the input level of the predetermined position calculated by the calculator for calculating the evaluated value of resolution and the input level of the other position.

* * * * *

UNITED STATES PATENT AND TRADEMARK OFFICE
CERTIFICATE OF CORRECTION

PATENT NO. : 6,760,096 B2
DATED : July 6, 2004
INVENTOR(S) : Masashi Kitabayashi, Koichi Kojima and Shunji Umemura It is certified that error appears in the above-identified patent and that said Letters Patent is hereby corrected as shown below:

Title page,
Item [75], Inventors, to read as follows:
-- [75] Masashi Kitabayashi, Nagano (JP); Koichi Kojima, Nagano (JP); Shunji Uemura, Nagano (JP) --

Signed and Sealed this

Twelfth Day of April, 2005

JON W. DUDAS
*Director of the United States Patent and Trademark Office*